United States Patent
Chen et al.

(10) Patent No.: US 11,550,739 B2
(45) Date of Patent: *Jan. 10, 2023

(54) STORAGE SYSTEM AND METHOD FOR SWITCHING WORKING MODE OF STORAGE SYSTEM

(71) Applicant: HUAWEI TECHNOLOGIES CO., LTD., Guangdong (CN)

(72) Inventors: Can Chen, Chengdu (CN); Xiaochu Li, Dongguan (CN); Ming Chen, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/667,968

(22) Filed: Feb. 9, 2022

(65) Prior Publication Data

US 2022/0171719 A1    Jun. 2, 2022

Related U.S. Application Data

(63) Continuation of application No. 17/130,272, filed on Dec. 22, 2020, now Pat. No. 11,275,699, which is a continuation of application No. PCT/CN2018/093196, filed on Jun. 27, 2018.

(51) Int. Cl.
G06F 13/16    (2006.01)
G06F 1/26    (2006.01)
G06F 3/06    (2006.01)

(52) U.S. Cl.
CPC .......... *G06F 13/1668* (2013.01); *G06F 1/266* (2013.01)

(58) Field of Classification Search
CPC .................... G06F 1/32; G06F 11/00
See application file for complete search history.

(56) References Cited

U.S. PATENT DOCUMENTS

| | | |
|---|---|---|
| 2005/0188060 A1 | 8/2005 | Meneghini et al. |
| 2012/0072755 A1 | 3/2012 | Jun |
| 2014/0126138 A1 | 5/2014 | Zhang et al. |
| 2017/0004098 A1 | 1/2017 | Das Sharma et al. |
| 2018/0113826 A1 | 4/2018 | Li |

FOREIGN PATENT DOCUMENTS

| | | |
|---|---|---|
| CN | 1624629 A | 6/2005 |
| CN | 102216992 A | 10/2011 |
| CN | 103744790 A | 4/2014 |

(Continued)

OTHER PUBLICATIONS

David A Patterson et al: "A case for redundant arrays of inexpensive disks (RAID)",Management of Data, ACM, 2 Penn Plaza, Suite 701 New York NY 10121-0701 USA, Jun. 1, 1988 (Jun. 1, 1988),pp. 109-116, XP058097897, Total 8 Pages.

(Continued)

*Primary Examiner* — Getente A Yimer

(57) ABSTRACT

A storage system comprises a storage drive that has a physical connector A and a physical connector B for connecting to the first control device and second control device, respectively. The physical connector A and physical connector B are independent access ports. The first control device is configured to access the storage drive through the physical connector A, and the second control device is configured to access the storage drive through the physical connector B.

14 Claims, 27 Drawing Sheets

(56) References Cited

FOREIGN PATENT DOCUMENTS

| | | | |
|---|---|---|---|
| CN | 104102742 | A | 10/2014 |
| CN | 104137184 | A | 11/2014 |
| CN | 104331133 | A | 2/2015 |
| CN | 105074675 | A | 11/2015 |
| CN | 105204 | A | 12/2015 |
| CN | 105320246 | A | 2/2016 |
| CN | 105739930 | A | 7/2016 |
| CN | 106055276 | A | 10/2016 |
| CN | 107817953 | A | 3/2018 |
| CN | 108228099 | A | 6/2018 |
| JP | 2006127836 | A | 5/2006 |
| JP | 2008027312 | A | 2/2008 |
| KR | 20140019885 | A | 2/2014 |
| WO | 2015059804 | A1 | 4/2015 |
| WO | 2018051386 | A1 | 3/2018 |

OTHER PUBLICATIONS

Orthogonal Backplane Connector Technology Offers Design Flexibility dated Dec. 7, 2010, total 2 pages.

CONT.
FROM
FIG. 15A

CONT.
FROM
FIG. 15A

The quantity of matching drives is equal to 0

S7: Determine a quantity of matching drives

The quantity of matching drives is larger than 1

The quantity of matching drives is equal to 1

S8: A power-on startup process of a single drive

S10: Power-on startup processes in batches

Drive access

S9: Control a drive to be in a working state

S11: Control drives to be in a working state in batches

S12: Complete system startup

STORAGE SYSTEM AND METHOD FOR SWITCHING WORKING MODE OF STORAGE SYSTEM

CROSS-REFERENCE TO RELATED APPLICATIONS

This application is a continuation of U.S. patent application Ser. No. 17/130,272, filed on Dec. 22, 2020, which is a continuation of International Application No. PCT/CN2018/093196, filed on Jun. 27, 2018. All of the aforementioned patent applications are hereby incorporated by reference in their entireties.

TECHNICAL FIELD

This disclosure relates to the field of storage technologies, and in particular, to a storage system and a method for switching a working mode of a storage system.

BACKGROUND

With development of technologies such as a big data analysis technology and an internet of things technology, data has become a core element for promoting progress of a related technology. Therefore, it becomes more important to ensure data storage reliability.

A data storage system includes a drive controller and a drive. Storage architectures of the storage system are classified into a centralized storage architecture and a distributed storage architecture based on a manner in which the drive controller accesses the drive. In the prior art, both the centralized storage architecture and the distributed storage architecture are inherent designs. To be specific, regardless of a storage architecture in the two storage architectures, the drive controller and the drive are fixedly connected and cannot be separated. If one storage architecture needs to be switched to the other storage architecture, for example, if the centralized storage architecture is to be switched to the distributed storage architecture, an entire storage architecture needs to be purchased. To be specific, a drive controller and a corresponding drive of the distributed storage architecture that are integrated need to be purchased. Apparently, costs are relatively high. It can be learned that a storage architecture in the prior art is not flexible, and is inconvenient for flexible deployment.

SUMMARY

Embodiments of this disclosure provide a storage system and a method for switching a working mode of a storage system, to improve flexibility of a storage architecture.

According to a first aspect, an embodiment of this disclosure provides a storage system, and the storage system includes M control devices, N first connectors, N second connectors, and K drives, where M, N, and K are positive integers;

the N first connectors are configured to detachably connect to the M control devices, the N second connectors are configured to detachably connect to the K drives, or configured to fixedly connect to the K drives, and each of the K drives is configured to store data;

each of the M control devices communicates with the K drives by using all of the N first connectors and all of the N second connectors, or each of the M control devices communicates with the K drives by using some of the N first connectors and some of the N second connectors; and each of the M control devices supports a first working mode and a second working mode, each of the K drives supports the first working mode and the second working mode, and when the M control devices switch from the first working mode to the second working mode, the K drives are controlled to switch from the first working mode to the second working mode; and when the first working mode is a mode running in a centralized storage architecture, the second working mode is a mode running in a distributed storage architecture, or when the first working mode is a mode running in a distributed storage architecture, the second working mode is a mode running in a centralized storage architecture.

In the foregoing technical solution, because the control device may be detachably connected to the first connector, and the drive may be detachably or fixedly connected to the second connector, a user may flexibly configure a connection relationship between the drive and the control device based on a use requirement, to constitute different storage architectures. In addition, because both the control device and the drive support two working modes, when the storage architecture needs to be changed, only working modes of the control device and the drive need to be switched or only the drive needs to be replaced, and a new control device and a new drive do not need to be purchased. This improves flexibility of the storage system and reduces storage architecture switching costs.

In a possible design, each of the M control devices is connected to all or some of the N first connectors, or each of the M control devices includes all or some of the N first connectors.

In the foregoing technical solution, the control device may be connected to the first connector in a plurality of manners. For example, the control device may be electrically connected to the first connector. Alternatively, the control device may include the first connector. For example, the first connector is disposed in the control device. Flexibility of the storage system can be improved.

In a possible design, one of the K drives has X second connectors, each of the M control devices is detachably connected to one second connector in each of the K drives by using all or some of the N first connectors, one first connector is connected to one second connector, and first connectors connected to the X second connectors are connected to different control devices, or first connectors connected to the X second connectors are included in different control devices, where X is a positive integer, and X is less than or equal to M.

In the foregoing technical solution, each drive may include a plurality of second connectors, and the plurality of second connectors in the drive are connected to different control devices by using a plurality of first connectors. In this way, when all the plurality of second connectors included in the drive are in a communication-capable state, different control devices connected to the plurality of second connectors in the drive may all access the drive, to constitute the centralized storage architecture. When only one of the plurality of second connectors included in the drive is in a communication-capable state, only one of different control devices connected to the plurality of second connectors in the drive can access the drive, to constitute the distributed storage architecture based on a use requirement. A state of the second connector in the drive is flexibly set to constitute different storage architectures.

In a possible design, the one first connector and the one second connector are perpendicular and orthogonal connectors that are reciprocal, or the one first connector and the one second connector are connectors that are reciprocal and that have a preset rotation angle.

In the foregoing technical solution, the first connector and the second connector may be used to overcome relative shifts between the control device and the drive in directions of an X axis, a Y axis, and a Z axis of a space coordinate system. Therefore, a plurality of control devices can be reliably connected to a plurality of drives, and a backplane in the prior art can be removed, to reduce design complexity of a storage system, and reduce a probability that the entire storage system cannot be used due to a fault of the backplane, thereby improving reliability of the storage system.

Further, the backplane in the prior art is removed, so that impedance mismatch points between the control device and the drive in a communication process can be reduced. To be specific, impedance mismatch between the control device and the backplane and impedance mismatch between the backplane and the drive are reduced. This can improve a signal transmission rate.

Further, the backplane in the prior art is removed, so that air flow obstacle points in the storage system are reduced, and heat dissipation performance of the storage system can be improved. Therefore, in specific space of the storage system and with specific heat dissipation performance of the storage system, more drives can be allowed in the storage system, and density in the storage system can be improved.

In a possible design, one of the M control devices is configured to: obtain information about each of the K drives, then determine working modes of the K drives based on the information about each of the K drives, and supply power to the K first connectors when determining that the working modes of the K drives match a current working mode of the control device.

In the foregoing technical solution, the control device supplies power to a drive only when determining that a working mode of the drive matches a working mode of the control device.

In this way, electric energy of the storage system can be used properly.

In a possible design, the control device is further configured to: after determining the working modes of the K drives based on the information about each of the K drives, stop supplying power to the K first connectors when determining that the working modes of the K drives do not match the current working mode of the control device.

In a possible design, the control device is configured to: obtain a state of each of the K drives, and when determining that S drives in the K drives are in a disconnected state or a faulty state, stop supplying power to S first connectors connected to the S drives.

In the foregoing technical solution, the control device may first determine a working state of a drive connected to the control device, and when determining that the working state of the drive is in a disconnected state or a faulty state, the control device does not supply power to the drive. In this way, electric energy of the storage system can be used properly, and a drive in the faulty state does not dissipate heat either, so that heat dissipation of the storage system can be reduced.

In a possible design, one of the K drives includes a high-speed signal interface and a low-speed signal interface. The high-speed signal interface is configured to transmit service data to the control device by using the X second connectors and the first connectors connected to the X second connectors, and the low-speed signal interface is configured to receive a first instruction entered from the X second connectors and used to obtain the information about the drive.

In the foregoing technical solution, the drive may communicate with the control device through different interfaces, so that the drive manages a signal sent by the control device.

In a possible design, each of the K drives further includes an internal drive control module. For each of the K drives: The low-speed signal interface is further configured to: receive a second instruction that is sent by a first control device in control devices corresponding to the first connector connected to the X second connectors and that is used to instruct to change a working mode of a drive that receives the second instruction to the mode running in the distributed storage architecture; and the internal drive control module is configured to: after the second instruction is received through the low-speed signal interface, control P second connectors in the X second connectors to be in a communication stopped state, where that one second connector is in a communication stopped state means that: the drive is controlled to stop communicating, by using the second connector, with a control device corresponding to a first connector connected to the second connector, where P is a positive integer, and a difference between X and P is 1.

In the foregoing technical solution, the drive may control, based on an instruction sent by the control device, the second connector in the drive to be in the communication stopped state, so that a working mode of the drive is switched to a mode in the distributed storage architecture, and the working mode of the storage system can be switched without changing a hardware structure and a connection relationship, the steps of switching the working mode of the storage system can be simplified.

In a possible design, each of the K drives further includes an internal drive control module. For each of the K drives: The low-speed signal interface is further configured to: receive a third instruction that is sent by a first control device in control devices corresponding to the first connector connected to the X second connectors and that is used to instruct to change a working mode of a drive that receives the third instruction to the mode running in the centralized storage architecture; and the internal drive control module is configured to: after the third instruction is received through the low-speed signal interface, and when P second connectors in the X second connectors are in a communication stopped state, control the drive to resume communicating, by using L second connectors, with control devices corresponding to L first connectors connected to the L second connectors, where L is a positive integer, and L is less than or equal to P.

According to a second aspect, this disclosure provides a method for switching a working mode of a storage system, and the method includes the following steps: When M control devices in the storage system run in a first working mode, and the M control devices support a second working mode, at least one of the M control devices sends, to each of K drives in the storage system, a first instruction that is used to instruct a drive that receives the first instruction to work in the second working mode, so that each of the K drives that receives the first instruction controls, according to the first instruction, P second connectors in X second connectors to be in a state adaptive to the second working mode, where when the first working mode is a mode running in a centralized storage architecture, the second working mode is a mode running in a distributed storage architecture, or when the first working mode is a mode running in a distributed storage architecture, the second working mode is a mode running in a centralized storage architecture. Each of the M control devices communicates with the K drives by using all of N first connectors and all of N second connectors, or each of the M control devices communicates with the K drives by using some of N first connectors and some of N second connectors, where the N first connectors are configured to detachably connect to the M control devices, and the N second connectors are configured to detachably connect to the K drives, or configured to fixedly connect to the K drives, and each of the K drives is configured to store data. M, N, K, X, and P are positive integers, and a difference between X and P is 1.

In the foregoing technical solution, when the storage system needs to switch a working mode, the working mode of the control device is switched and the control device sends a working mode switching instruction to a drive, to switch the working mode of the storage system without changing a hardware structure and a connection relationship. The steps of switching the working mode of the storage system can be simplified.

In a possible design, the controlling, when the second working mode is the mode running in the distributed storage architecture, controlling one of the P second connectors to be in a state adaptive to the second working mode includes: controlling the drive to stop communicating, by using the second connector, with a control device corresponding to the first connector connected to the second connector; or when the second working mode is the mode running in the centralized storage architecture, controlling one of the P second connectors to be in a state adaptive to the second working mode includes: controlling the drive to resume communicating, by using L second connectors in the P second connectors, with control devices corresponding to L first connectors connected to the L second connectors, where L is a positive integer, and L is less than or equal to P.

In the foregoing technical solution, the drive may switch the working mode of the drive by controlling a communication status of the second connector in the drive according to the instruction sent by the control device. For example, when the mode running in the distributed storage architecture needs to be switched, some of the M second connectors are controlled to be in a communication stopped state, and when the mode running in the centralized storage architecture needs to be switched, some or all of the second connectors that are in the communication stopped state resume communication. Therefore, the working mode of the drive is switched to the mode in the centralized storage architecture, and the working mode of the drive can be switched without changing the hardware structure and the connection relationship.

According to a third aspect, an embodiment of this disclosure further provides a computer readable storage medium, and the computer readable storage medium includes a computer program, and when the computer program runs on a terminal, the storage system is enabled to perform the method in the second aspect or any one of the possible designs of the second aspect.

According to a fourth aspect, an embodiment of this disclosure further provides a computer program product, and when the computer program product runs on a terminal, the storage system is enabled to perform the method in the second aspect or any one of the possible designs of the second aspect.

For beneficial effects of the third aspect and the fourth aspect and the implementations of the third aspect and the fourth aspect, refer to descriptions of beneficial effects of the method in the second aspect and the implementations of the second aspect.

BRIEF DESCRIPTION OF DRAWINGS

FIG. 15A to FIG. 15C are a flowchart of a storage system running method according to an embodiment of this disclosure.

DESCRIPTION OF EMBODIMENTS

To make the objectives, technical solutions, and advantages of the embodiments of this disclosure clearer, the following describes the technical solutions in the embodiments of this disclosure in detail with reference to the accompanying drawings in this specification and specific implementations.

The term "and/or" in this specification describes only an association relationship for describing associated objects and represents that three relationships may exist. For example, A and/or B may represent the following three cases: only A exists, both A and B exist, and only B exists. In addition, the character "I" in this specification generally indicates an "or" relationship between the associated objects, unless otherwise specified.

In addition, it should be understood that "a plurality of" in the embodiments of this disclosure means "two or more". Words such as "first" and "second" are merely used for distinction and description, and shall not be understood as an indication or implication of relative importance or an indication or implication of an order.

The embodiments of this disclosure provide a storage system. The storage system is applied to a data read/write scenario shown in FIG. 1A or FIG. 1B. In the data read/write scenario shown in FIG. 1A, a client accesses, by using a drive controller, a drive connected to the drive controller. For example, when the client needs to obtain data in the drive, the client sends a data read instruction to the drive controller. After receiving the data read instruction, the drive controller obtains the data from the drive that stores the data, and sends the data to the client. When the client needs to store data, the client sends a data write instruction to the drive controller. The data write instruction carries to-be-stored data. After receiving the data write instruction, the drive controller obtains the to-be-stored data from the data write instruction, and stores the to-be-stored data in a corresponding drive.

Figure 1A:
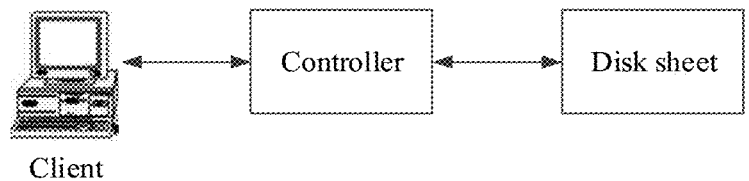
FIG. 1A is a schematic diagram of an disclosure scenario according to an embodiment of this disclosure.
Figure 1B:
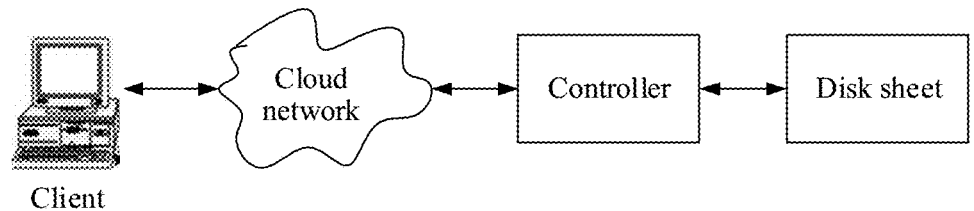
FIG. 1B is a schematic diagram of an disclosure scenario according to an embodiment of this disclosure.

Different from FIG. 1A, in the data read/write scenario shown in FIG. 1B, a client sends a data read instruction or a data write instruction to a drive controller by using a cloud network. After receiving the data read instruction by using the cloud network and obtaining data from a corresponding drive, the drive controller sends the data to the client by using the cloud network. After receiving the data write instruction by using the cloud network, the drive controller stores, in a corresponding drive, to-be-stored data obtained from the data write instruction.

It should be noted that in the scenarios shown in FIG. 1A and FIG. 1B, interaction between one client, one drive controller, and one drive is merely used as an example for description, and should not constitute any limitation on an application scenario of the embodiments of this disclosure. In an actual data read/write scenario, there may be a plurality of clients, a plurality of drive controllers, and a plurality of drives. For example, the plurality of clients may access a drive connected to any one of the plurality of drive controllers, or the plurality of clients may access only a drive connected to a specific drive controller. This is not limited in the embodiments of this disclosure.

Figure 2A:
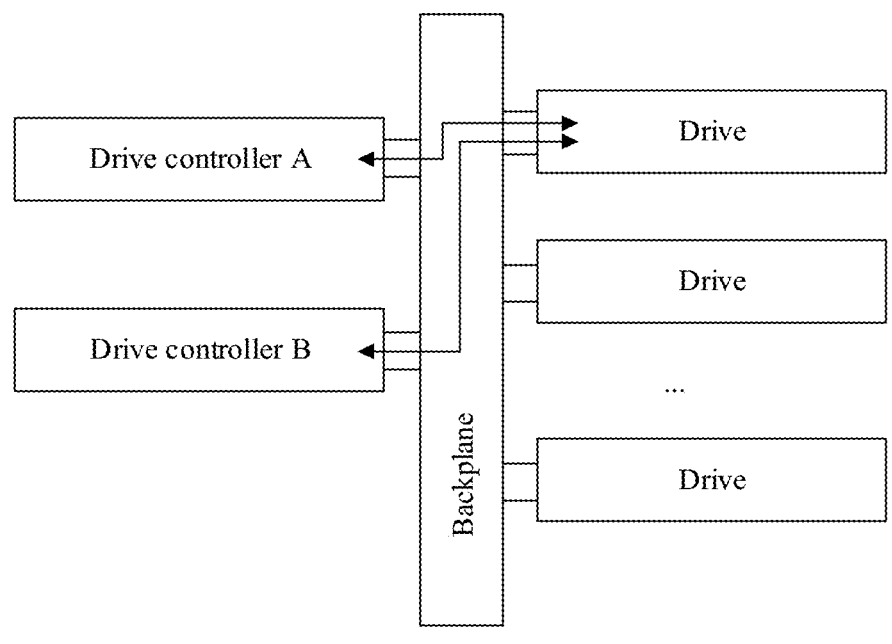
FIG. 2A is an architectural diagram of an example of a centralized storage system.

The drive controllers and the drives may be in a centralized storage architecture. As shown in FIG. 2A, the centralized storage architecture includes a drive controller A, a drive controller B, a plurality of drives, and a backplane. In the centralized storage architecture, one piece of data is stored in one of the plurality of drives. For example, video data of a user A is stored in a drive 1, and voice data of the user A is stored in a drive 2. When an operation needs to be performed on a piece of data, the drive controller A or the drive controller B may send an instruction, and output the instruction to a drive by using the backplane, to obtain the data from the corresponding drive. In the centralized storage architecture, both the drive controller A and the drive controller B can access data stored in the drives, and after either of the drive controller A or the drive controller B is faulty, a service of the faulty drive controller may be taken over by the other drive controller, and the other drive controller continues to bear the service of the faulty drive controller.

Figure 2B:
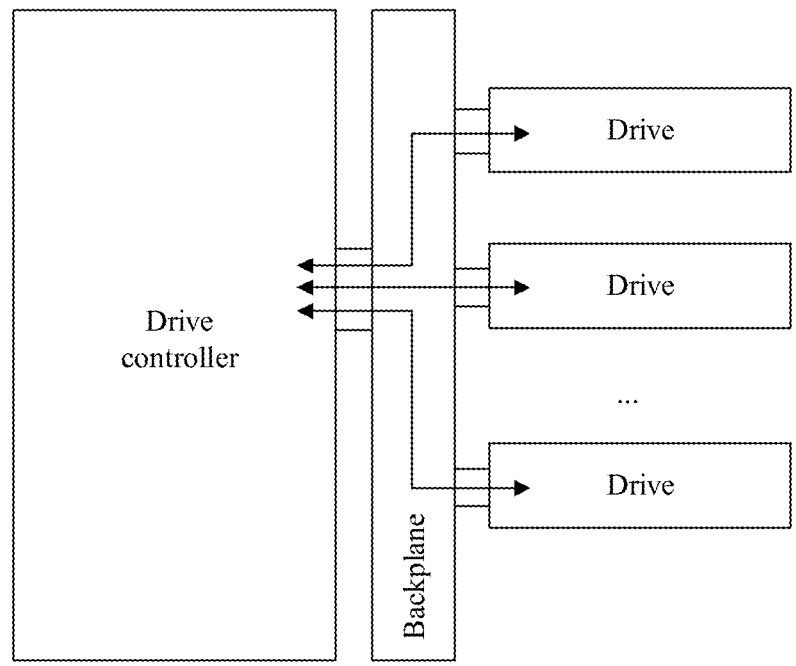
FIG. 2B is an architectural diagram of an example of a distributed storage system.

The drive controllers and the drives may be in a distributed storage architecture. FIG. 2B shows an example of the distributed storage architecture. The distributed storage architecture includes one drive controller, a plurality of drives, and a backplane. In the distributed storage architecture, data may be divided into a plurality of pieces of data, and a check code corresponding to each piece of data is generated. Each piece of data and the corresponding check code are stored in each of the plurality of drives. For example, video data of a user A is divided into video data 1 to video data 3, check codes respectively corresponding to the video data 1 to the video data 3 are generated: a check code 1 to a check code 3. Then, the video data 1 and the check code 1 are stored in a drive 1, the video data 2 and the check code 2 are stored in a drive 2, and the video data 3 and the check code 3 are stored in a drive 3. When the drive controller needs to read the video data, the drive controller may send a data read instruction, and fan-out the instruction to the drive 1 to the drive 3 by using the backplane, to obtain the video data 1 to the video data 3 and the check code 1 to the check code 3 from the three drives. Then, the drive controller processes, for example, combines, the video data 1 to the video data 3 and the check code 1 to the check code 3, to finally obtain the video data.

The following describes in detail the storage system provided in the embodiments of this disclosure with reference to the accompanying drawings.

Figure 3A:
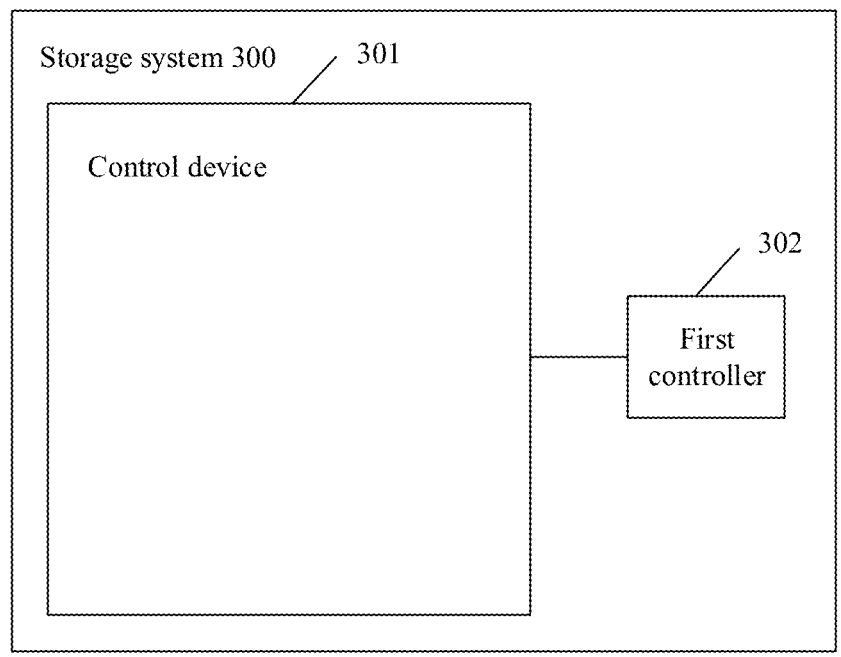
FIG. 3A is a schematic structural diagram of a storage system 300 according to an embodiment of this disclosure.

FIG. 3A is a schematic structural diagram of a storage system 300 according to an embodiment of this disclosure. The storage system 300 includes at least one control device 301 and a first connector 302. The first connector 302 is configured to detachably connect to a drive, and the drive is configured to store data. The at least one control device 301 is configured to communicate, by using the first connector 302, with the drive connected to the first connector 302. The drive may be a solid state disk (SSD), for example, an SSD with a serial advanced technology attachment (SATA) interface, an SSD with a serial attached small computer system interface (SAS) interface, or an SSD with a non-volatile memory express (NVME) interface. The drive may alternatively be a hard disk drive (HDD), for example, an HDD with an SATA interface or an HDD with an SAS interface. This is not limited herein.

It should be noted that, that the at least one control device 301 communicates, by using the first connector 302, with the drive connected to the first connector 302 may be understood as follows: When there are K first connectors 302, and K>0, and if each of the K first connectors 302 is connected to a drive, the at least one control device 301 communicates, by using the K first connectors 302, with the drives connected to the K first connectors 302. If only some of the K first connectors 302 are connected to drives, the at least one control device 301 communicates, by using the some first connectors 302, with the drives connected to the some first connectors 302.

In the foregoing technical solution, because the drive may be detachably connected to the control device 301 by using the first connector 302, a user may flexibly configure a connection relationship between the drive and the control device 301 based on a use requirement, to constitute different storage architectures. For example, one control device 301 is connected to a plurality of drives by using the first connector 302, to constitute a distributed storage architecture. Alternatively, two control devices 301 are connected to one drive by using the first connector 302, to constitute a centralized storage architecture. In this way, when a storage architecture needs to be changed, a connection relationship between the first connector 302 and the drive needs to be changed, and a new control device and a new drive do not need to be purchased. This improves flexibility of the storage system.

The following describes the control device 301 and the first connector 302.

Figure 3B:
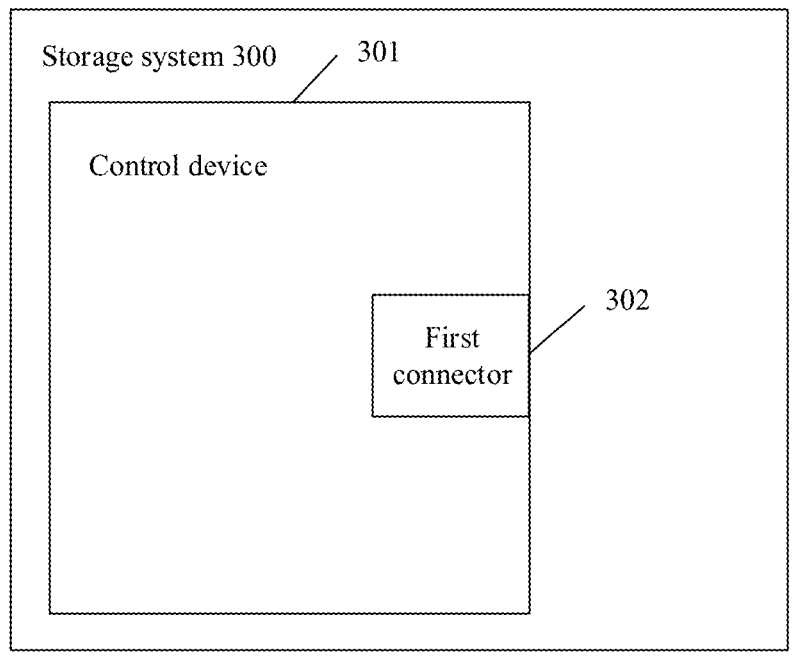
FIG. 3B is another schematic structural diagram of a storage system 300 according to an embodiment of this disclosure.

In an example, there is one control device 301 and one first connector 302. As shown in FIG. 3A, the control device 301 and the first connector 302 may be two independent components. The control device 301 and the first connector 302 may be connected by using a communications bus. For example, the communications bus may be a peripheral component interface express (PCIe) bus. Alternatively, as shown in FIG. 3B, the control device 301 may include a first connector 302. In this case, the first connector 302 is a part of the control device 301. For example, the first connector 302 may be a fan-out connector of the control device 301. The fan-out connector is a connector that extends a plurality of signals on one node or a plurality of nodes to a larger space range.

Figure 3C:
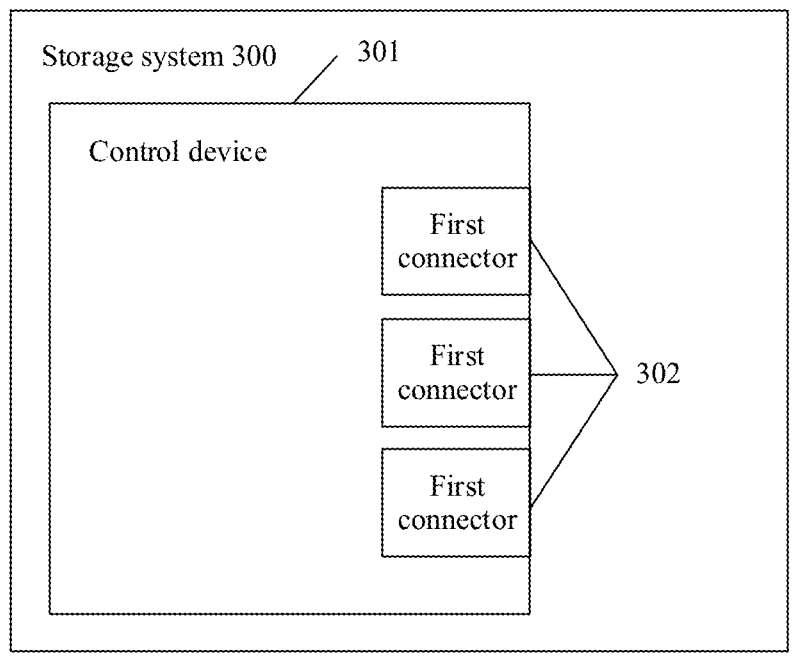
FIG. 3C is another schematic structural diagram of a storage system 300 according to an embodiment of this disclosure.

In another example, there may be a plurality of first connectors 302. For example, the first connectors 302 are a part of the control device 301. As shown in FIG. 3C, the control device 301 includes three first connectors 302, and each first connector 302 may be configured to connect to a drive.

Figure 3D:
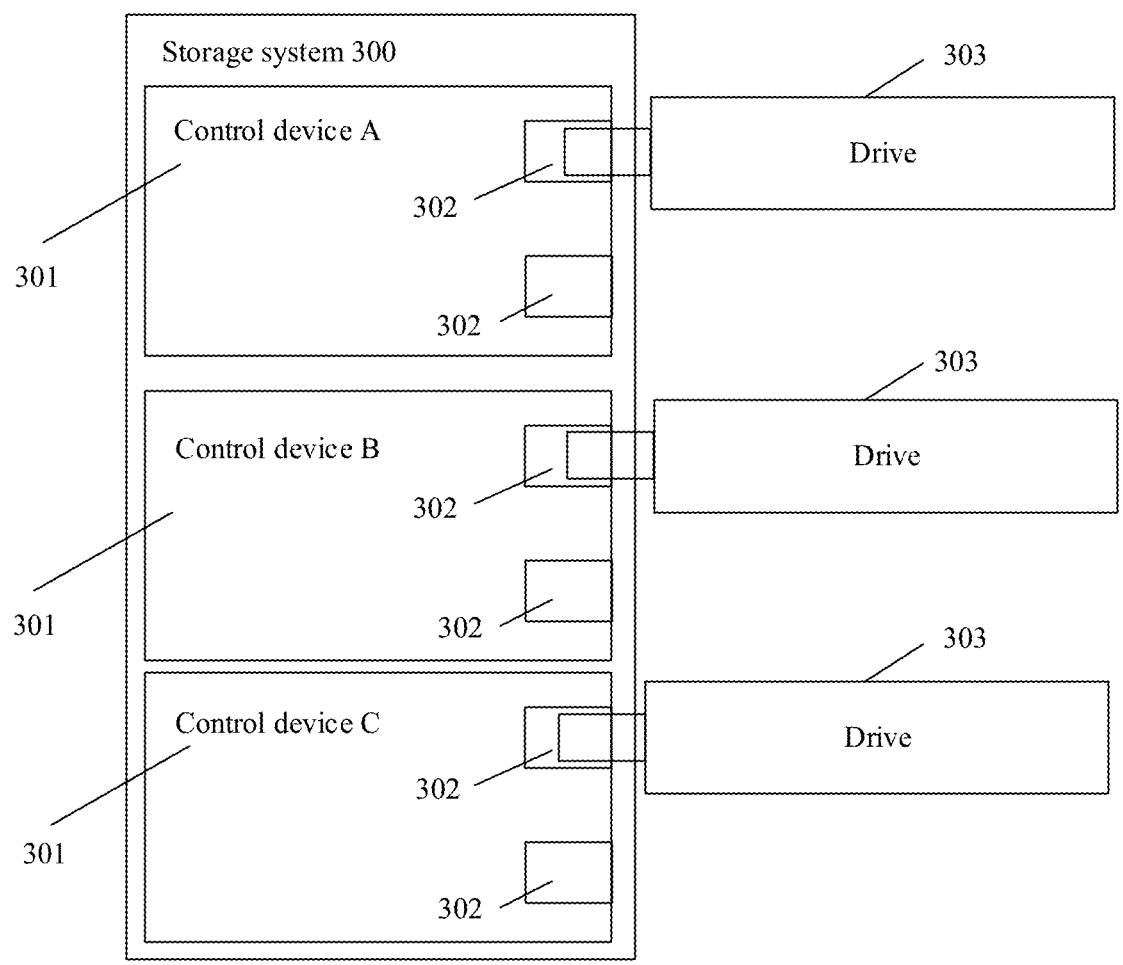
FIG. 3D is another schematic structural diagram of a storage system 300 according to an embodiment of this disclosure.

In an example, there may be a plurality of control devices 301. Referring to FIG. 3D, the storage system 300 includes M control devices 301 and N first connectors 302, and the N first connectors 302 are configured to connect to drives, where M is an integer greater than or equal to 2, N is an integer greater than or equal to M, and K is a positive integer.

A configuration relationship between each control device 301 and a first connector 302 is shown in FIG. 3A to FIG. 3 C, and details are not described again. In FIG. 3D, for example, the first connectors 302 are a part of the control device 301. Quantities of first connectors 302 included in all the control devices 301 may be the same. For example, each of the M control devices 301 may include S first connectors 302. Quantities of first connectors 302 included in all the control devices 301 may alternatively be different. For example, the $1^{st}$ control device 301 in the M control devices 301 includes three first connectors 302, the $2^{nd}$ control device 301 in the M control devices 301 includes two first connectors 302, and so on. In FIG. 3D, for example, M is 3, and each of three control devices 301 includes two first connectors 302.

The following describes the control device 301. In the following descriptions, for example, the first connectors 302 are a part of the control device 301.

Figure 4:
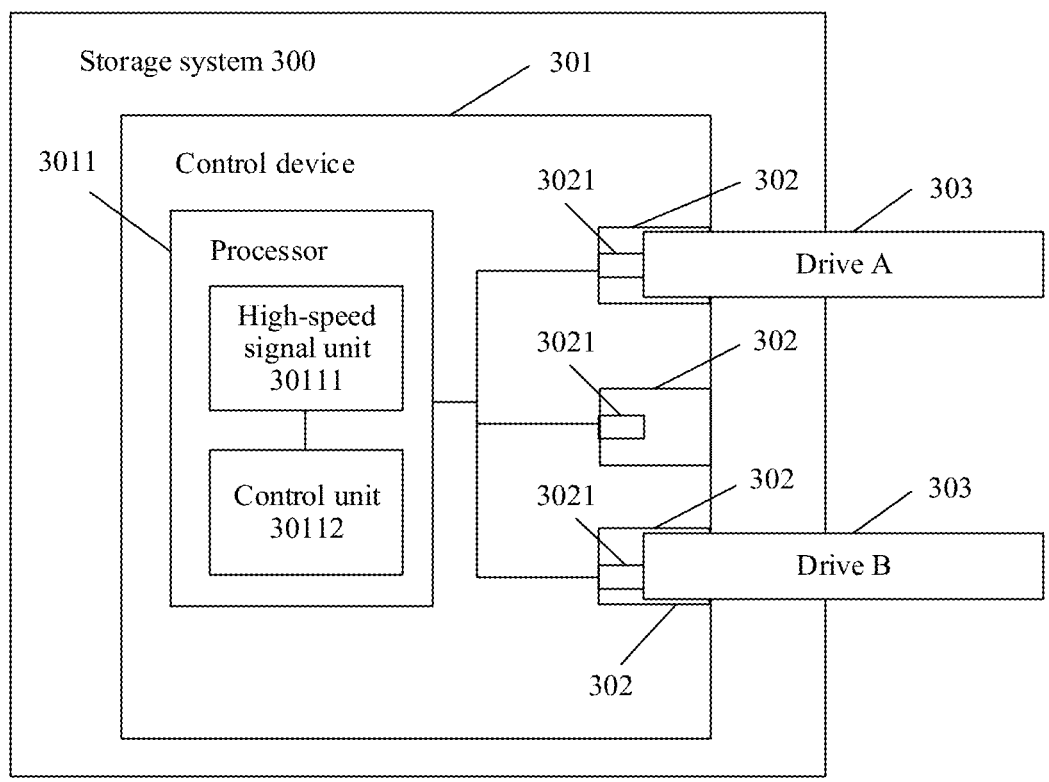
FIG. 4 is a schematic structural diagram of a processor 3011 included in a control device 301 in a storage system 300 according to an embodiment of this disclosure.

In an example, referring to FIG. 4, the control device 301 may include a processor 3011. The processor 3011 is electrically connected to the first connector 302. The processor 3011 may be a central processing unit (CPU), a digital signal processor, an application-specific integrated circuit, or a field programmable gate array (FPGA) or another programmable logic device. This is not limited herein.

In an example, the processor 3011 may include a high-speed signal unit 30111 and a control unit 30112. The high-speed signal unit 30111 is configured for service data transmission between the processor 3011 and a drive. For example, the processor 3011 obtains, by using the high-speed signal unit 30111, data stored in the drive, or the processor 3011 stores, in the drive by using the high-speed signal unit 30111, to-be-stored data received from the client. The control unit 30112 is configured to detect a state of a drive, for example, detect whether the drive is connected to or disconnected from the first connector 302, detect whether the drive is in a faulty state, detect information about the drive, control a power-on state or a power-off state of the drive, and control a reset state or a reset de-asserted state of a port, used to transmit service data, of the drive. The following separately describes the high-speed signal unit 30111 and the control unit 30112.

The high-speed signal unit 30111 may be configured to supply power to the first connector 302 when determining that a working mode of a drive connected to the first connector 302 matches a current working mode of the processor 3011, so that the drive connected to the first connector 302 is powered on.

In this embodiment of this disclosure, before determining whether the working mode of the drive matches the current working mode of the high-speed signal unit 30111, the high-speed signal unit 30111 may first determine whether the first connector 302 is connected to or disconnected from the drive. For example, still referring to FIG. 4, a detection circuit 3021 may be disposed in the first connector 302, and the detection circuit 3021 is electrically connected to the high-speed signal unit 30111. When the first connector 302 is disconnected from the drive, the detection circuit 3021 outputs a first level, for example, a low level, to the high-speed signal unit 30111. When the first connector 302 is connected to the drive, the detection circuit 3021 outputs a second level, for example, a high level, to the high-speed signal unit 30111. In this case, a determining condition may be preset in the high-speed signal unit 30111, and the determining condition may be as follows: If receiving the second level output by the detection circuit 3021, the high-speed signal unit 30111 determines that the first connector 302 corresponding to the detection circuit 3021 is connected to the drive; and if receiving the first level output by the detection circuit, the high-speed signal unit 30111 determines that the first connector 302 corresponding to the detection circuit 3021 is disconnected from the drive. For example, when receiving the high level output by the detection circuit 3021, the high-speed signal unit 30111 determines that the first connector 302 corresponding to the detection circuit 3021 is connected to the drive.

It should be noted that, if there are a plurality of first connectors 302, a detection circuit 3021 may be disposed in each first connector 302, and it is determined, based on a level output by the detection circuit 3021 in each first connector 302, whether the first connector 302 is connected to the drive.

The high-speed signal unit 30111 may further determine, based on a change of a level output by the detection circuit 3021, whether a connection between the first connector 302 and the drive is loose. For example, if the high-speed signal unit 30111 determines that the level output by the detection circuit 3021 changes from the first level to the second level or changes from the second level to the first level at an interval of 0.5 s, the high-speed signal unit 30111 determines that the connection between the first connector 302 and the drive is loose.

If the high-speed signal unit 30111 determines that the first connector 302 is connected to the drive, the high-speed signal unit 30111 may further send, by using the first connector 302, first information to the drive connected to the first connector 302. The first information is used to detect whether the drive connected to the first connector 302 is faulty. If the drive is not faulty, the drive sends feedback information corresponding to the first information to the high-speed signal unit 30111 by using the first connector 302. If the drive is faulty, the drive cannot send the feedback information to the high-speed signal unit 30111. The first information and the feedback information may be agreed on in advance by the high-speed signal unit 30111 with the drive. Then, if the high-speed signal unit 30111 does not receive the feedback information within preset duration by using the first connector 302 after sending the first information to the drive connected to the first connector 302, the high-speed signal unit 30111 determines that the drive connected to the first connector 302 is faulty.

If the high-speed signal unit 30111 determines that the first connector 302 is connected to the drive, and the drive connected to the first connector 302 is not faulty, the high-speed signal unit 30111 may obtain the working mode of the drive connected to the first connector 302.

In this embodiment of this disclosure, a working mode of the high-speed signal unit 30111 includes a first working mode and a second working mode. The first working mode may also be referred to as a processor centralized working mode, and indicate that the high-speed signal unit 30111 works in a processing mode that is the same as that of the drive controller in the centralized storage architecture shown in FIG. 2A. For example, after receiving a data write instruction from the client, the high-speed signal unit 30111 sends to-be-stored data carried in the data write instruction to the drive. The second working mode may also be referred to as a processor distributed working mode, and indicate that the high-speed signal unit 30111 works in a processing mode that is the same as that of the drive controller in the distributed storage architecture shown in FIG. 2B. For example, after receiving a data write instruction from the client, the control device 301 first divides to-be-stored data carried in the data write instruction into a plurality of pieces of subdata, generates a check code corresponding to each piece of subdata, and sends each piece of subdata and the check code corresponding to the subdata to the drive.

The working mode of the drive includes a third working mode and a fourth working mode. The third working mode may also be referred to as a drive centralized working mode, and indicate that the drive works in a processing mode that is the same as that of the drive in the centralized storage architecture shown in FIG. 2A, for example, in a drive shared access mode. To be specific, a plurality of control devices connected to the drive may all perform a read/write operation on the drive. The fourth working mode may also be referred to as a drive distributed working mode, and indicate that the drive works in a processing mode that is the same as that of the drive in the distributed storage architecture shown in FIG. 2B, for example, in a drive exclusive working mode. To be specific, only one of a plurality of control devices connected to the drive may perform a read/write operation on the drive.

In a specific implementation process, it may be set that the working mode of the high-speed signal unit 30111 includes only one of the first working mode and the second working mode. In this case, the high-speed signal unit 30111 works in a fixed working mode. When the working mode of the high-speed signal unit 30111 is set to the first working mode, the high-speed signal unit 30111 can work only in the first working mode. For example, the high-speed signal unit 30111 may determine, according to an instruction of a user, to work in one of the working modes. In an example, a system code corresponding to at least one working mode may be set in the high-speed signal unit 30111. For example, at least one of a first system code corresponding to the first working mode and a second system code corresponding to the second working mode may be set. After the processor 3011 is powered on, the high-speed signal unit 30111 reads and runs a corresponding system code stored in the control unit 30112, so that the high-speed signal unit 30111 can enter a working mode corresponding to the system code. System code includes information such as high-reliability fault tolerance policies of storage systems, working modes of drives, and types, manufacturers, and models of the drives in different working modes.

In this embodiment of this disclosure, the high-speed signal unit 30111 determines whether the working mode of the drive connected to the first connector 302 matches the current working mode of the processor 3011. A determining manner includes but is not limited to the following two manners:

In a first manner, the high-speed signal unit 30111 may first obtain information about a drive by using the control unit 30112, where the information about the drive includes at least one type of related information, such as a model, a capacity, and a manufacturer of the drive. The high-speed signal unit 30111 pre-stores a correspondence between the information about the drive and a working mode of the drive; in this case, the high-speed signal unit 30111 can determine the working mode of the drive based on the correspondence between the information about the drive and the working mode of the drive. For example, the correspondence between the information about the drive and the working mode of the drive includes: a first correspondence between a manufacturer A and the third working mode and a second correspondence between a manufacturer B and the fourth working mode. If the information about the drive that is obtained by the high-speed signal unit 30111 by using the control unit 30112 indicates that the manufacturer of the drive is the manufacturer A, the high-speed signal unit 30111 may determine that the working mode of the drive is the third working mode. Then, the high-speed signal unit 30111 may determine whether the working mode of the drive matches the current working mode of the high-speed signal unit 30111.

In a second manner, if the high-speed signal unit 30111 determines the current working mode of the high-speed signal unit 30111, the high-speed signal unit 30111 may set a corresponding drive determining condition. The drive determining condition includes information about a drive when a working mode of the drive matches the current working mode of the high-speed signal unit 30111. The information about the drive is the same as corresponding content in the first manner, and is not described again. For example, if the current working mode of the high-speed signal unit 30111 is the first working mode, the drive determining condition is set to a manufacturer A. Then, when the information about the drive is the same as the drive determining condition, the high-speed signal unit 30111 determines that the working mode of the drive matches the current working mode of the high-speed signal unit 30111. If the information about the drive is different from the drive determining condition, the high-speed signal unit 30111 determines that the working mode of the drive does not match the current working mode of the high-speed signal unit 30111.

It should be noted that, that the working mode of the high-speed signal unit 30111 matches the working mode of the drive means that: When the working mode of the high-speed signal unit 30111 is the first working mode, the working mode of the drive is the third working mode; or when the working mode of the high-speed signal unit 30111 is the second working mode, the working mode of the drive is the fourth working mode. Certainly, if working modes of the high-speed signal unit 30111 and the drive further include another working mode, that the working mode of the high-speed signal unit 30111 matches the working mode of the drive may further include another correspondence. This is not limited herein.

In addition, it should be noted that, that the high-speed signal unit 30111 obtains the information about the drive by using the control unit 30112 may be as follows: The information about the drive is pre-stored in a fixed storage space in the drive, and when the drive is connected to the first connector 302, the high-speed signal unit 30111 reads the information about the drive from the fixed storage space in the drive by using the control unit 30112.

After determining a drive whose working mode matches the current working mode of the high-speed signal unit 30111, the high-speed signal unit 30111 supplies power to a first connector 302 connected to the drive. As shown in FIG. 4, when the high-speed signal unit 30111 determines that the $1^{st}$ first connector 302 and the $3^{rd}$ first connector 302 in three first connectors 302 are respectively connected to a drive A and a drive B, and a working mode of the drive connected to the $1^{st}$ first connector 302 matches the current working mode of the high-speed signal unit 30111, the high-speed signal unit 30111 supplies power to the $1^{st}$ first connector 302.

After determining a drive whose working mode does not match the current working mode of the high-speed signal unit 30111, the high-speed signal unit 30111 stops supplying power to a first connector 302 connected to the drive. As shown in FIG. 4, when the high-speed signal unit 30111 determines that the $1^{st}$ first connector 302 and the $3^{rd}$ first connector 302 in three first connectors 302 are respectively connected to a drive A and a drive B, and a working mode of the drive connected to the $3^{rd}$ first connector 302 does not match the current working mode of the high-speed signal unit 30111, the high-speed signal unit 30111 stops supplying power to the $3^{st}$ first connector 302.

It should be noted that, that the high-speed signal unit 30111 supplies power to the first connector 302 means that: If the first connector 302 connected to the drive is currently powered on, the high-speed signal unit 30111 keeps supplying power to the first connector 302 by keeping a power supply status of the control unit 30112. If the first connector 302 connected to the drive is currently powered off, the high-speed signal unit 30111 supplies power to the first connector 302 by changing the power supply status of the control unit 30112. It should be noted that, that the high-speed signal unit 30111 stops supplying power to the first connector 302 means that: If the first connector 302 connected to the drive is currently powered on, the high-speed signal unit 30111 stops, by changing the power supply status of the control unit 30112, supplying power to the first connector 302. If the first connector 302 connected to the drive is currently powered off, the high-speed signal unit 30111 keeps, by keeping the power supply status of the control unit 30112, the first connector 302 powered off.

After the high-speed signal unit 30111 supplies power to at least one first connector 302, for example, after the high-speed signal unit 30111 supplies power to M first connectors 302, the high-speed signal unit 30111 may send, by using M1 first connectors 302 in the M first connectors 302, a data read instruction to one or more of drives connected to the M1 first connectors 302, and obtain, by using the M1 first connectors 302, data corresponding to the data read instruction, where M1 is an integer greater than 0 and less than or equal to M. Alternatively, the high-speed signal unit 30111 may send a data write instruction to one or more of the drives connected to the M1 first connectors 302, to store to-be-stored data carried in the data write instruction into the drive.

After the high-speed signal unit 30111 sends, by using the M1 first connectors 302 in the M first connectors 302, the data read instruction or the data write instruction to one or more in the drives connected to the M1 first connectors 302, the high-speed signal unit 30111 may further continue to detect whether each of the M first connectors 302 is connected to a drive. If the high-speed signal unit 30111 determines that a first connector 302 is disconnected from a drive, the high-speed signal unit 30111 may stop supplying power to the first connector 302.

Figure 5:
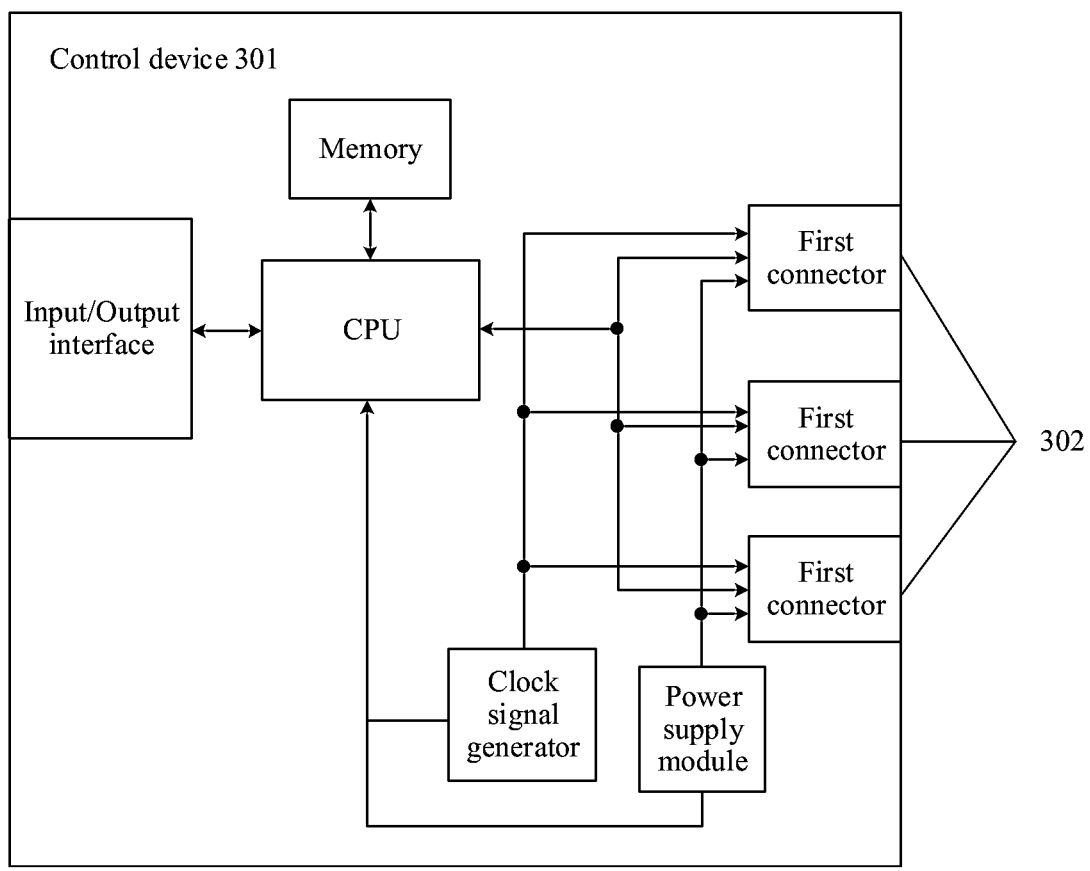
FIG. 5 is a schematic structural diagram of a plurality of discrete components included in a control device 301 in a storage system 300 according to an embodiment of this disclosure.

In an example, the control device 301 may include a plurality of discrete components. Referring to FIG. 5, the control device 301 may include a processor, a memory, a clock signal generator, and a power supply module. The processor is, for example, a central processing unit (CPU), an FPGA, or another programmable logic device. This is not limited herein. An example in which the processor is a CPU is used in the following descriptions.

The CPU in the control device 301 is configured to communicate, by using the first connector 302, with the drive connected to the first connector 302. For example, the CPU may communicate with the drive by using a drive transmission protocol. The drive transmission protocol is, for example, a PCIE protocol, a serial ATA interface attachment (SATA) protocol, or a serial attached small computer system interface (SAS) protocol. If there are a plurality of first connectors 302, the CPU may communicate, by using all of the plurality of first connectors 302, with drives connected to the all first connectors 302. Alternatively, the CPU may communicate, by using some of the plurality of first connectors 302, with drives connected to the some first connectors 302. Communication between the CPU and the drives may include: after receiving to-be-stored data from another device (for example, the client), storing, by the CPU, the to-be-stored data in a corresponding drive; or after receiving a data read instruction from another device, obtaining, by the CPU from a drive, data corresponding to the data read instruction.

The memory in the control device 301 is connected to the CPU, and is configured to provide a cache function for the CPU during communication between the CPU and the drives. For example, after receiving to-be-stored data from the client, the CPU first stores the to-be-stored data in the memory, and then sends a data write instruction to the drives to store the to-be-stored data in a corresponding drive.

The clock signal generator in the control device 301 is separately connected to the CPU and the first connector 302, and is configured to provide clocks for the CPU and the drive connected to the first connector 302. It should be noted that, when there are a plurality of first connectors 302, the clock signal generator is connected to each first connector 302. The clocks include a first clock required for communication between the CPU and the drive by using the drive transmission protocol, and/or include working clocks of the CPU and the drive and a local phase-locked loop clock. The first clock may alternatively be referred to as a high-speed clock, or a phase-locked loop clock used by a drive 303 to sample data. If a transmission protocol used by the drive 303 supports the working clock or the local phase-locked loop clock, the clock signal generator may not need to provide the first clock. The drive transmission protocol is, for example, the PCIE protocol, the serial ATA interface attachment (serial advanced technology attachment, SATA) protocol, or the serial attached small computer system interface (serial attached small computer system interface, SAS) protocol.

The power supply module in the control device 301 is separately connected to the CPU and the first connector 302, and is configured to provide operating voltages for the CPU and the drive connected to the first connector 302. It should be noted that when there are a plurality of first connectors 302, the power supply module is connected to each first connector 302.

In an example, as shown in FIG. 5, the control device 301 further includes an input/output interface configured to connect to the client. The input/output interface is electrically connected to the CPU, and is configured to receive a data read instruction or a data write instruction from the client, and then transmit the data read instruction or the data write instruction to the CPU. If the input/output interface obtains the data read instruction from the client, the input/output interface is further configured to transmit, to the client, data that corresponds to the data read instruction and that is sent by the CPU. The input/output interface may be a SAS, a PCIE interface, a gigabit Ethernet interface (GE), or another interface. This is not limited herein.

In an example, the CPU may be configured to control the power supply module to supply power to the first connector 302 when determining that the working mode of the drive connected to the first connector 302 matches a current working mode of the CPU, so that the drive connected to the first connector 302 is powered on.

Figure 6:
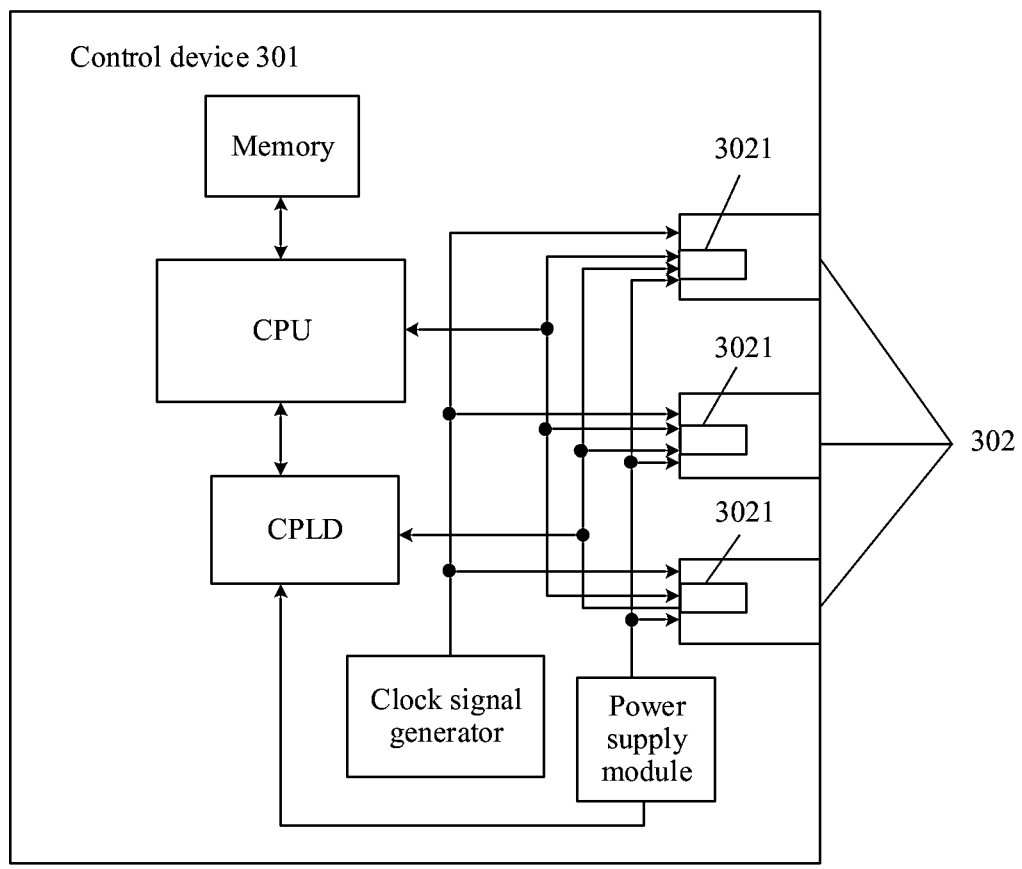
FIG. 6 is a schematic structural diagram of a detection circuit 3021 further included in a storage system 300 according to an embodiment of this disclosure.

In this embodiment of this disclosure, before determining whether the working mode of the drive matches the current working mode of the CPU, the CPU may first determine whether the first connector 302 is connected to or disconnected from the drive. Referring to FIG. 6, in this case, the control device 301 may further include a detection component. The detection component is separately connected to the CPU, the first connector 302, and the power supply module, and the power supply module is further configured to provide an operating voltage for the detection component. The detection component may be configured to detect whether the first connector 302 is connected to or disconnected from the drive. It should be noted that, when there are a plurality of first connectors 302, the detection component is connected to each first connector 302. For example, the detection component may be a complex programmable logic device (CPLD) or an application-specific integrated circuit (ASIC). In FIG. 6, an example in which the detection component is the CPLD is used.

Figure 7:
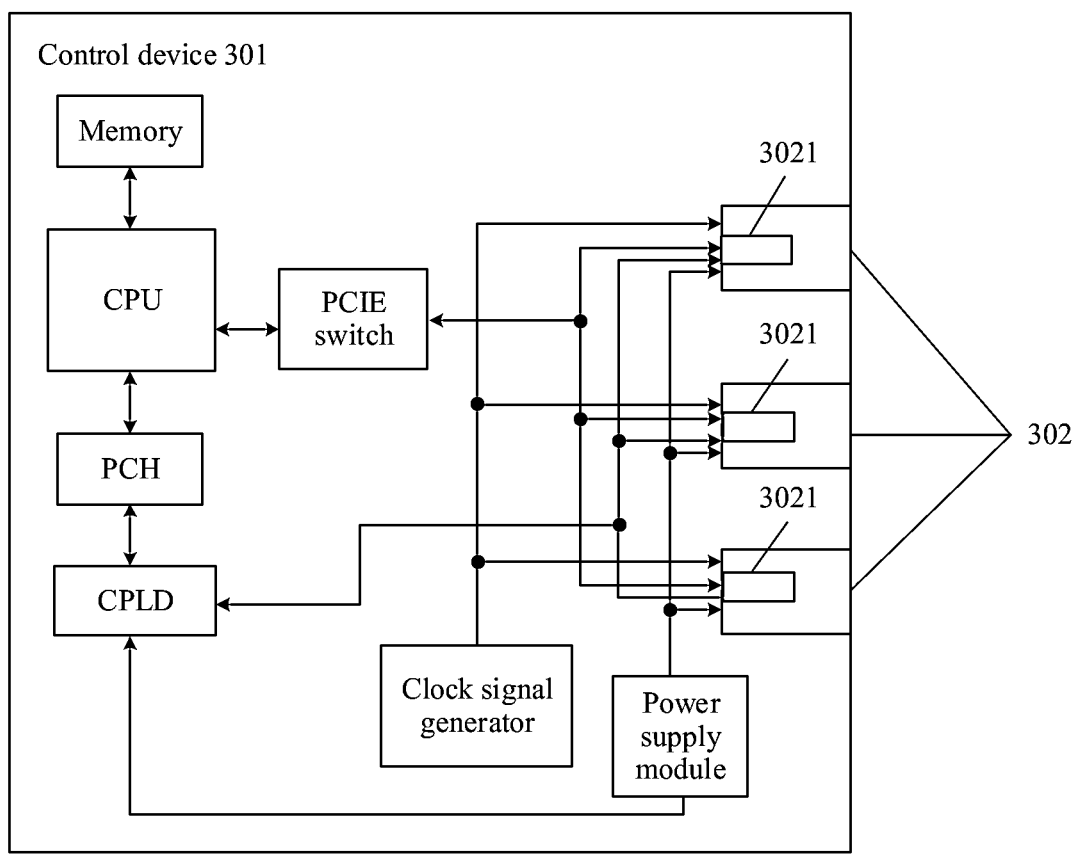
FIG. 7 is a schematic structural diagram of a PCIE switch further included in a storage system 300 according to an embodiment of this disclosure.

It should be noted that, in FIG. 6, the CPLD is directly connected to the CPU. In another example, the CPLD may alternatively be connected to the CPU by using a peripheral port extension chip of the CPU. In FIG. 7, an example in which the peripheral port extension chip of the CPU is an integrated southbridge (PCH) is used, and the PCH and the CPLD may be connected by using a low pin count (LPC).

Still referring to FIG. 6, the detection circuit 3021 may further be disposed in the first connector 302. When the first connector 302 is disconnected from the drive, the detection circuit 3021 outputs the first level, for example, a low level, to the CPLD. When the first connector 302 is connected to the drive, the detection circuit 3021 outputs the second level, for example, a high level, to the CPLD. If the second level output by the detection circuit 3021 is received, the CPLD determines that the first connector 302 corresponding to the detection circuit 3021 is connected to the drive; if the first level output by the detection circuit is received, the CPLD determines that the first connector 302 corresponding to the detection circuit 3021 is disconnected from the drive. For example, when receiving the high level output by the detection circuit 3021, the CPLD determines that the first connector 302 corresponding to the detection circuit 3021 is connected to the drive.

After the CPLD determines whether the first connector 302 is connected to or disconnected from the drive, the CPU may obtain a determining result of the CPLD in a plurality of manners, and the determining result is used to indicate whether the first connector 302 is connected to or disconnected from the drive. For example, a manner in which the CPU obtains the determining result of the CPLD includes but is not limited to the following two manners:

In a first obtaining manner, the CPLD may send the determining result to the CPU. If there are a plurality of first connectors 302, when the CPLD sends the determining result to the CPU, an identifier of the first connector 302 may be carried. For example, numbers may be set for the plurality of first connectors 302, and the CPLD adds the numbers of the first connectors 302 to the determining result.

In a second obtaining manner, the CPLD may set a register configured to store the determining result, for example, the register is referred to as a first register. The CPLD may store the determining result in the first register, for example, may use one bit to represent the determining result. If a value of the one bit is 0, it indicates that the first connector 302 is connected to the drive are state, and if the value of the one bit is 1, it indicates that the first connector 302 is disconnected from the drive. If the CPU needs to obtain the determining result, the CPU directly reads a value in the first register, and determines, based on the value in the first register and a preset correspondence between the value of the bit in the first register and a connect status, whether the first connector 302 is connected to or disconnected from the drive. The correspondence between the value in the first register and the connect status may be: If the value of the bit in the first register is 0, it indicates that the first connector 302 is connected to the drive, and if the value of the bit in the first register is 1, it indicates that the first connector 302 is disconnected from the drive.

It should be noted that, in the second manner, when there are a plurality of first connectors 302, the CPLD may set a corresponding first register for each first connector 302. The CPU reads a value in the first register corresponding to each first connector 302, and may determine whether each first connector 302 is disconnected from or connected to a drive.

Alternatively, the CPLD may set only one first register, and store a determining result corresponding to each first connector 302 in the first register. To be specific, the first register includes a plurality of bits, and one bit indicates a determining result corresponding to one first connector 302. As shown in FIG. 6, the control device 301 includes three first connectors 302. The CPLD sets one first register, determining results corresponding to all the first connectors 302 are indicated by using three bits in the first register, and one bit in the first register is used to indicate a determining result corresponding to one first connector 302. For example, if values of the bits in the register are "001", it indicates that the $3^{rd}$ first connector 302 is disconnected from a drive, and the remaining two first connectors 302 are separately connected to drives. If values of the bits in the register are "000", it indicates that each of the third first connectors 302 is disconnected from the drive.

The CPLD may further send, by using the first connector 302, first information to the drive connected to the first connector 302. The first information is used to detect whether the drive connected to the first connector 302 is faulty. If the drive is not faulty, the drive sends feedback information corresponding to the first information to the CPLD by using the first connector 302. If the drive is faulty, the drive cannot send the feedback information to the CPLD. The first information and the feedback information may be agreed on in advance by the CPLD and the drive. Then, if the CPLD does not receive the feedback information within preset duration by using the first connector 302 after sending the first information to the drive connected to the first connector 302, the CPLD determines that the drive connected to the first connector 302 is faulty. Correspondingly, the CPLD may also store a detection result about whether a detected drive is faulty in a corresponding register, for example, a second register.

If the CPU determines, based on a value of a bit in the corresponding register in the CPLD, that the first connector 302 is connected to the drive, and the drive connected to the first connector 302 is not faulty, the CPU may obtain the working mode of the drive connected to the first connector 302.

In this embodiment of this disclosure, the working mode of the drive and the working mode of the CPU are described above, and details are not described herein again. The CPU obtains the information about the drive connected to the first connector 302, and determines whether the working mode of the drive matches the working mode of the CPU. A specific determining manner is already described in the foregoing, and is not described herein again.

In this embodiment of this disclosure, a manner in which the CPU obtains the information about the drive includes but is not limited to the following two manners:

In a first manner for obtaining the information about the drive, the CPU may send, by using a bus connected to the first connector 302 to the drive connected to the first connector 302, an instruction that is used to obtain the information about the drive. After receiving the instruction, the drive sends the information about the drive to the CPU. In this case, the bus connecting the CPU and the first connector 302 may be a customized bus, or a bus configured to transmit a high-speed signal, such as a PCIE bus. The high-speed signal is a corresponding signal used when the CPU communicates with the drive by using a drive transmission protocol. This is not limited herein.

In a second manner for obtaining the information about the drive, as shown in FIG. 7, the control device 301 further includes a PCIE switch. The PCIE switch is connected to the CPU by using a PCIE bus, and the PCIE switch is connected to the first connector 302 by using an I2C bus. The CPU sends, by using the PCIE switch to the drive connected to the first connector 302, an instruction that is used to obtain the information about the drive. After receiving the instruction, the drive sends the information about the drive to the CPU.

After determining the drive whose working mode matches the current working mode of the CPU, the CPU sends, to the CPLD, an instruction for supplying power to the first connector 302 connected to the drive, so that the CPLD controls the power supply module to supply power to the first connector 302. After determining the drive whose working mode does not match the current working mode of the CPU, the CPU sends, to the CPLD, an instruction for stop supplying power to the first connector 302 connected to the drive, so that the CPLD controls the power supply module to stop supplying power to the first connector 302.

It should be noted that, the CPLD controls the power supply module to supply power to the first connector 302 and the CPLD controls the power supply module to stop supplying power to the first connector 302, and these are already described above and are not described herein again.

After the CPU supplies power to at least one first connector 302, the CPU may communicate with the drive by using the at least one first connector 302. In addition, the CPU may also send a reset instruction or a reset de-asserted instruction to the drive by using the CPLD, to control a port that is of the drive and that is used to transmit service data to be in the reset state or the reset de-asserted state.

The CPLD may further determine, based on a detected data read instruction or a detected data write instruction sent by the CPU to the drive connected to the first connector 302, the operation state of the drive connected to the first connector 302. For example, if the CPLD detects the data read instruction sent by the CPU to the drive connected to the first connector 302, the CPLD determines that the drive is in a read operation state. If the CPLD detects the data write instruction sent by the CPU to the drive connected to the first connector 302, the CPLD determines that the drive is in a write operation state. Certainly, the CPLD may also set a register configured to store a working state of the drive. A specific manner is the same as the foregoing manner of storing a detection result about whether the detected drive is faulty in the corresponding register, and is not described herein again.

The CPLD may further send an interrupt signal to the PCIE switch after determining that a connection between the first connector 302 and the drive changes from a connected state to a disconnected state, or after information such as a working state of the drive connected to the first connector 302 changes, and the PCIE switch sends the interrupt signal to the CPU. After receiving the interrupt signal, the CPU processes the changes.

Still referring to FIG. 4, the storage system 300 provided in this embodiment of this disclosure may further include the drives 303.

In this embodiment of this disclosure, the drive 303 may include but is not limited to the following three types. A first drive type is a drive that can be used only in a centralized storage architecture, and may be referred to as a centralized drive. A second drive type is a drive that can be used only in a distributed storage architecture, and may be referred to as a distributed drive. A third drive type is a drive that can be used in both a centralized storage architecture and a distributed storage architecture, and may be referred to as a general drive. The three types of drives are separately described below.

Figure 8A:
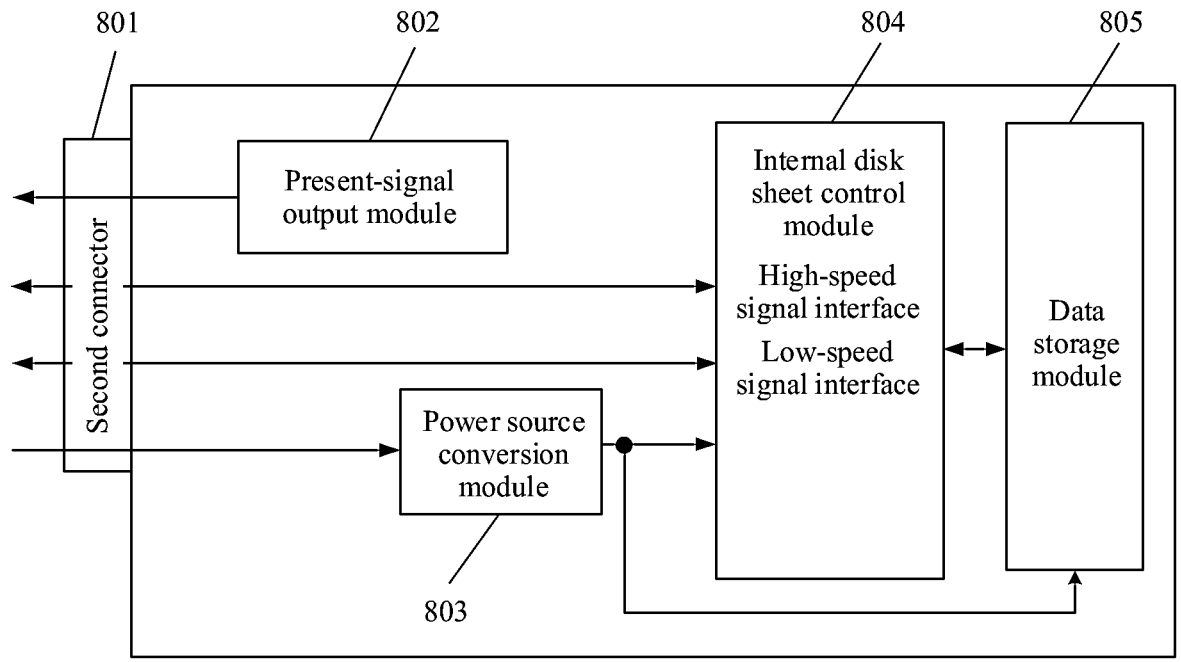
FIG. 8A is a schematic diagram of a distributed drive according to an embodiment of this disclosure.

The first drive/distributed drive:

Referring to FIG. 8A, the drive 303 includes a second connector 801, a present-signal output module 802, a power source conversion module 803, an internal drive control module 804, and a data storage module 805.

The second connector 801 is configured to connect to the control device 301, and provide a channel for data communication between the control device 301 and the drive 303. For example, after being connected to the first connector 302, the drive 303 obtains a data read instruction from the control device 301 by using the second connector 801, and then sends data corresponding to the data read instruction to the control device 301 by using the second connector 801.

The present-signal output module 802 is configured to generate a present signal of the drive 303, where the present-signal is used to indicate whether the drive 303 is connected to or disconnected from the first connector 302. In an example, the control device 301 may include a peripheral circuit and a logic determining module. When the drive 303 is connected to the first connector 302 by using the second connector 801, the present-signal output module 802 is connected to a ground cable of the power supply module of the control device 301 by using the second connector 801, so that the peripheral circuit in the control device 301 generates a low level signal, and the logic determining module in the control device 301 determines, based on the low level signal, that the drive 303 is connected to the first connector 302. After the second connector 801 of the drive 303 is disconnected from the first connector 302, the peripheral circuit in the control device 301 generates a high level signal, so that the logic determining module in each control device 301 determines, based on the high level signal, that the drive 303 is disconnected from the first connector 302.

The power source conversion module 803 supplies power to the drive 303, and is configured to: when the second connector 801 is connected to the first connector 302, convert a power source voltage input from the second connector 801 into power supply voltages of the internal drive control module 804 and the data storage module 805, and output the converted voltages to the internal drive control module 804 and the data storage module 805. For example, the power conversion module 803 may be a buck circuit (Buck circuit) or the like.

The drive 303 may further include an anti-backflow module that is disposed between the second connector 801 and the power conversion module 803, to avoid abnormal power supply to the drive 303 caused because the control device 301 is short-circuited or a voltage output by the control device 301 is lower than a normal working voltage of the drive 303.

The internal drive control module 804 is configured to implement functions of processing a signal of the control device 301 and managing the drive 303, for example, receive a control signal of the control device 301 for the drive 303 and provide a function of performing a read operation or a write operation on data in the data storage module 805. For example, the control signal is a signal used to read related information such as a model, a capacity, and a manufacturer of the drive 303, a signal used to control the second connector 801 to remain in a reset state, and a signal used to control the second connector 801 to de-assert the reset state.

Figure 8B:
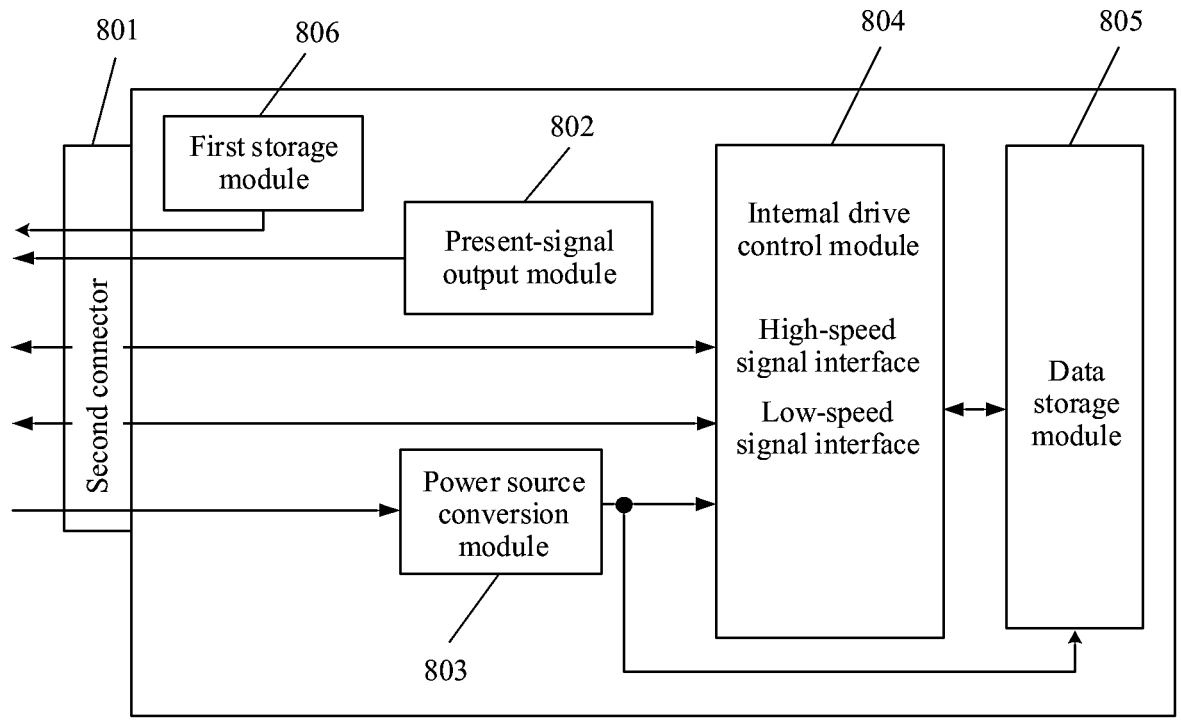
FIG. 8B is another schematic diagram of a distributed drive according to an embodiment of this disclosure.

In an example, as shown in FIG. 8B, the drive 303 may further include a first storage module 806, and the first storage module 806 is configured to store the related information such as the model, the capacity, and the manufacturer of the drive 303. The control device 301 may directly read the related information such as the model, the capacity, and the manufacturer of the drive 303 from the first storage module 806. For example, the first storage module 806 may include an electrically erasable programmable read-only memory (electrically erasable programmable read only memory, EEPROM) chip and an I2C circuit.

If an indicator used to display a working state of the drive is disposed in the drive 303, the internal drive control module 804 may be further configured to control the indicator of the drive 303. For example, when the drive 303 is in a data read state, the input signal indicator may be controlled to output an indication signal of a first frequency; when the drive 303 is in a data write state, the input signal indicator may be controlled to output an indication signal of a second frequency; and so on.

In addition, a high-speed signal interface and a low-speed signal interface are set in the internal drive control module 804, and the internal drive control module 804 may communicate with the control device 301 through different interfaces. A definition of the high-speed signal is described above. In communication signals transmitted between the internal drive control module 804 and the control device 301, a signal other than the high-speed signal is a low-speed signal.

Certainly, the internal drive control module 804 may further have other functions, and examples are not listed one by one herein. It should be noted that a person skilled in the art may set a function of the internal drive control module 804 based on a use requirement. This is not limited herein.

In an example, the internal drive control module 804 may be implemented by using one discrete device or a combination of a plurality of discrete devices, for example, may be a central processing unit (central processing unit, CPU), a digital signal processor, an application-specific integrated circuit, a field programmable gate array (field-programmable gate array, FPGA), or another programmable logic device. This is not limited herein.

The data storage module 805 is configured to store or read user data under control of the internal drive control module 804. In an example, the data storage module may be a drive medium.

Figure 9A:
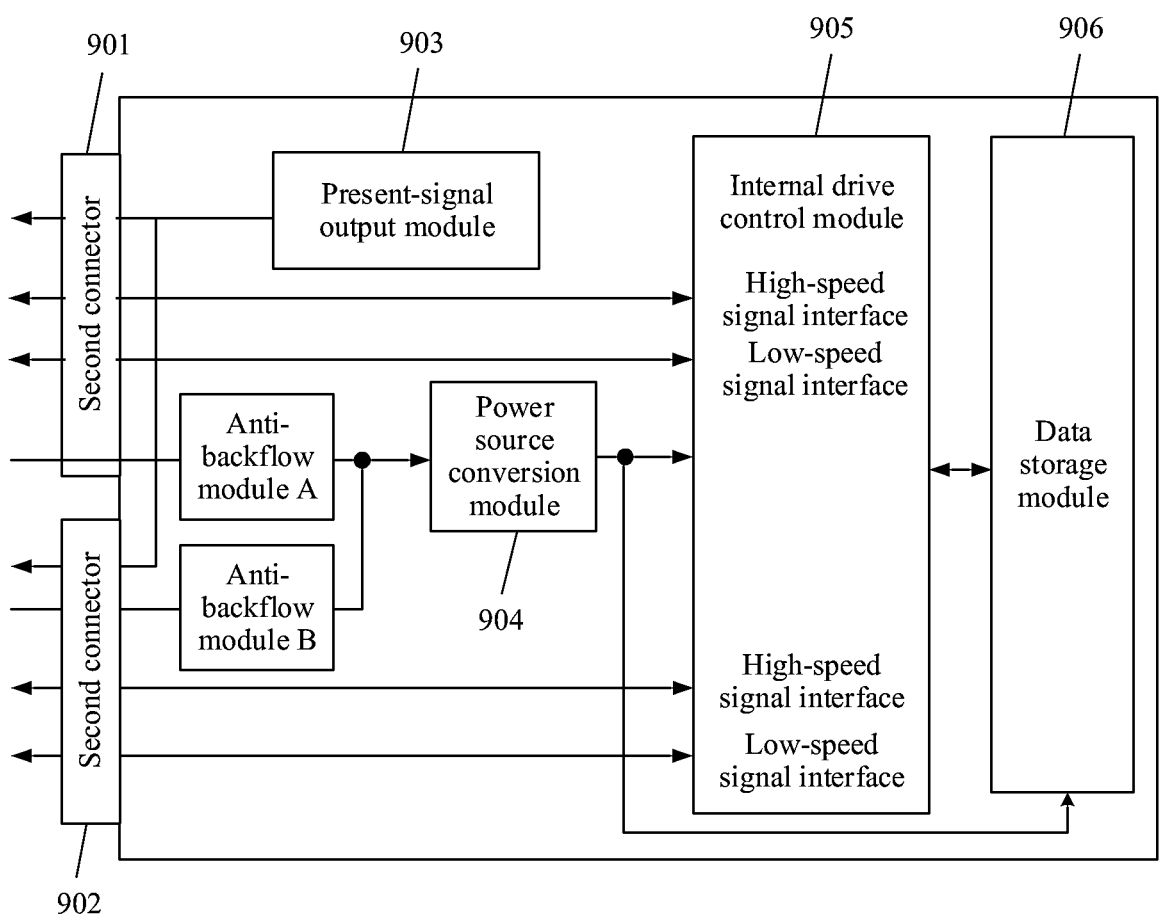
FIG. 9A is a schematic diagram of a centralized drive according to an embodiment of this disclosure.

The Second Drive/Centralized Drive:

Referring to FIG. 9A, the drive 303 includes two second connectors (which are a second connector 901 and a second connector 902), a present-signal output module 903, a power source conversion module 904, an internal drive control module 905, and a data storage module 906.

Functions of the second connector 901 and the second connector 902 are the same as that of the access port 801, and details are not described herein again. The second connector 901 and the second connector 902 are two independent access ports, and may be respectively connected to two control devices 301. In this way, after the two control devices 301 are respectively connected to the second connector 901 and the second connector 902, the two control devices 301 may both communicate with the drive 303, for example, read data in the data storage module 906 in the drive 303.

It should be noted that, in FIG. 9A, the drive 303 includes two access ports: the second connector 901 and the second connector 902. A quantity of access ports in the drive 303 may also be greater than two. For example, the drive 303 includes the second connector, the second connector, and a third access port. In this case, the drive 303 may be simultaneously connected to three control devices 301. The quantity of access ports is not limited in this embodiment of this disclosure.

Figure 9B:
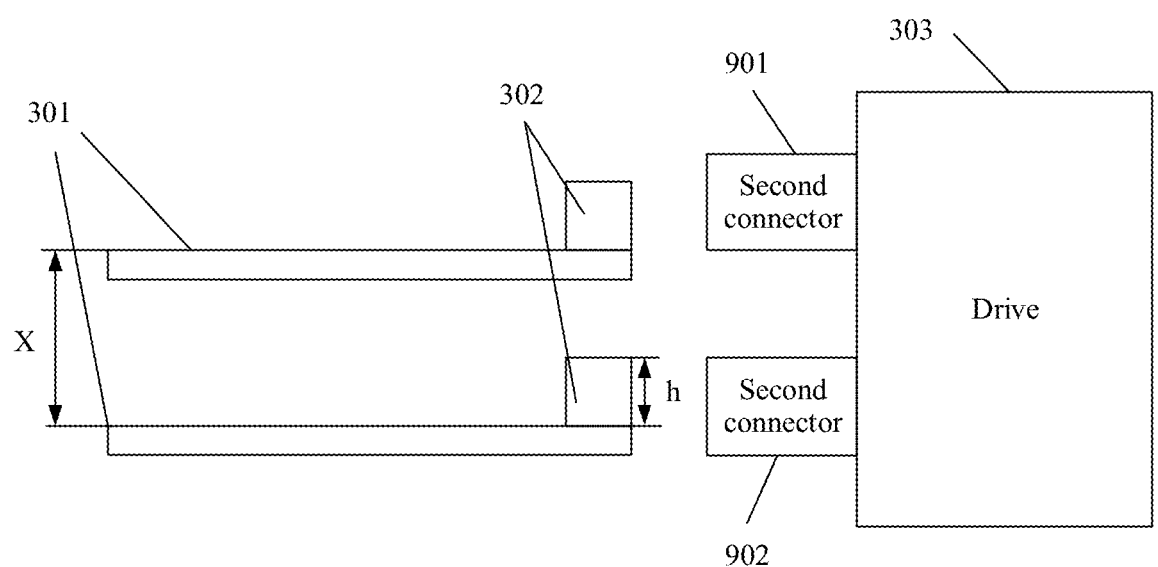
FIG. 9B is a schematic diagram of a spacing between two second connectors in a centralized drive according to an embodiment of this disclosure.

It should be noted that, if the second connector 901 and the second connector 902 need to be connected to two control devices 301 simultaneously, a sufficient spacing needs to be reserved between the second connector 901 and the second connector 902, and the spacing is related to an interval between the two control devices 301. For example, as shown in FIG. 9B, two control devices 301 are both horizontally disposed, and one control device 301 is right above the other control device 301. If the interval between the two control devices 301 is x, and a width of the first connector 302 is h, the spacing between the second connector 901 and the second connector 902 is greater than or equal to (x−h).

The present-signal output module 903 is configured to generate a present signal of the drive 303, where the present-signal is used to indicate whether the drive 303 is connected to or disconnected from the first connector 302. In an example, the control device 301 may include a peripheral circuit and a logic determining module. When the drive 303 is connected to the two first connectors 302 respectively by using the second connector 901 and the second connector 902, the present-signal output module 903 is connected to ground cables of power supply modules in the two control device 301 respectively by using the second connector 901 and the second connector 902, so that the peripheral circuit in the control device 301 generates a low level signal, and a logic determining module in each control device 301 determines, based on the low level signal, that the drive 303 is connected to the first connector 302. After the second connector 901 and the second connector 902 in the drive 303 are respectively disconnected from the first connectors 302 in the two control devices 301, the peripheral circuit in each control device 301 generates a high level signal, so that the logic determining module in each control device 301 determines, based on the high level signal, that the drive 303 is disconnected from the first connector 302.

The power source conversion module 904 supplies power to the drive 303, and is configured to: when the second connector 901 and the second connector 902 are respectively connected to the two first connectors 302, convert power source voltages input from the second connector 901 and the second connector 902 into power supply voltages of the internal drive control module 905 and the data storage module 906, and output the converted voltages to the internal drive control module 905 and the data storage module 906. For example, the power conversion module may be a buck circuit (Buck circuit) or the like.

The drive 303 further includes anti-backflow modules. The anti-backflow modules include an anti-backflow module A and an anti-backflow module B, and are respectively disposed between the second connector 901 and the power source conversion module 904 and between the second connector 902 and the power source conversion module 904.

The internal drive control module 905 is configured to implement functions of processing a signal of the control device 301 and managing the drive 303, for example, receive a control signal of the control device 301 for the drive 303 and provide a function of performing a read operation or a write operation on data in the data storage module 906. For example, the control signal is a signal used to read related information such as a model, a capacity, and a manufacturer of the drive 303, a signal used to control the second connector 901 and the second connector 902 to remain in a reset state, and a signal used to control the second connector 901 and the second connector 902 to de-assert the reset state.

Figure 9C:
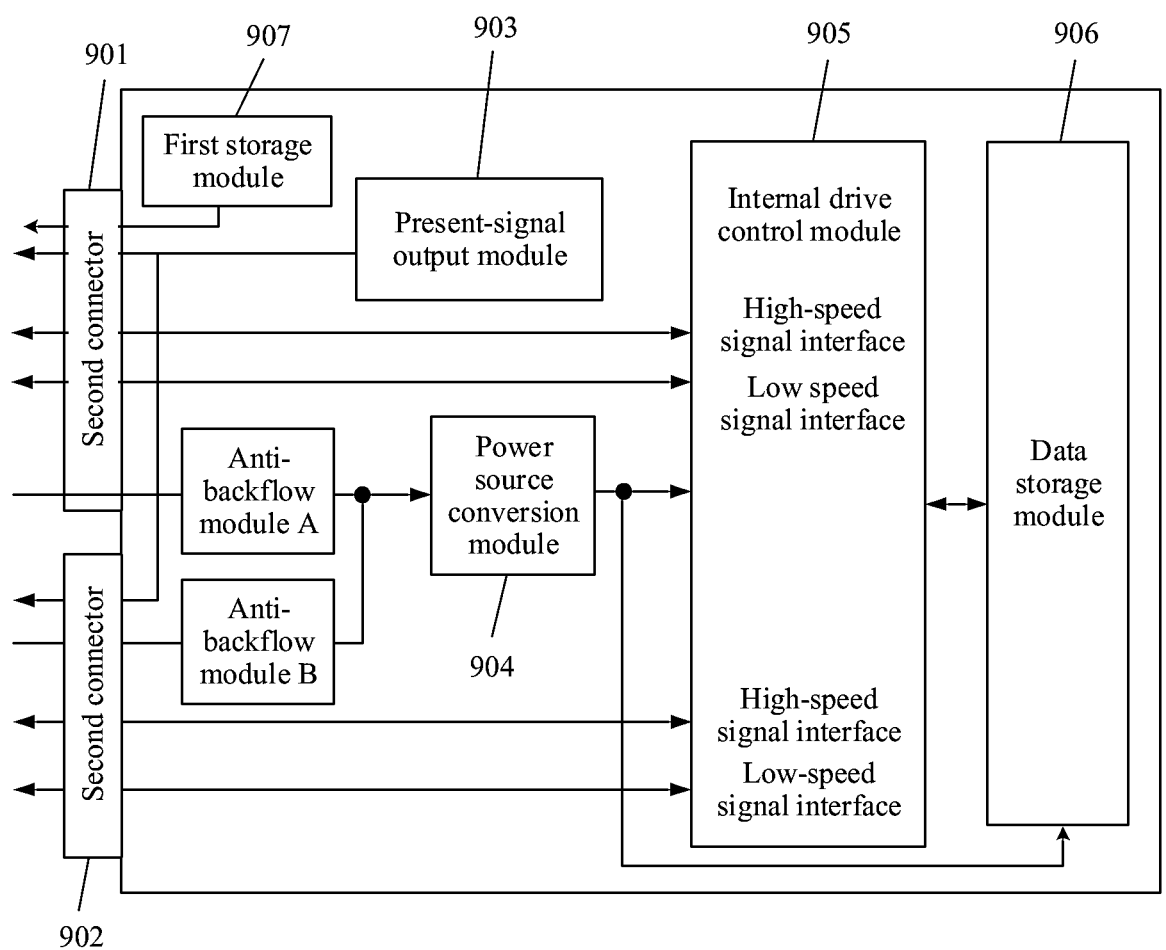
FIG. 9C is another schematic diagram of a centralized drive according to an embodiment of this disclosure.

In an example, as shown in FIG. 9C, the drive 303 may further include a first storage module 907. The first storage module 907 is the same as the first storage module 806 shown in FIG. 8B, and details are not described herein again.

If an indicator used to display a working state of the drive is disposed in the drive 303, the internal drive control module 804 may be further configured to control the indicator of the drive 303. For example, when the drive 303 is in a data read state, the input signal indicator may be controlled to output an indication signal of a first frequency; when the drive 303 is in a data write state, the input signal indicator may be controlled to output an indication signal of a second frequency; and so on.

In addition, a high-speed signal interface and a low-speed signal interface for the second connector 901, and a high-speed signal interface and a low-speed signal interface for the second connector 902 are separately set in the internal drive control module 905. The internal drive control module 905 may communicate, by using the high-speed signal interface and/or the low-speed signal interface for the second connector 901, with the control device 301 connected to the second connector 901. The internal drive control module 905 may communicate, by using the high-speed signal interface and/or the low-speed signal interface for the second connector 902, with the control device 301 connected to the second connector 901. A definition of the high-speed signal is described above. In communication signals transmitted between the internal drive control module 905 and the control device 301, a signal other than the high-speed signal is a low-speed signal.

Certainly, the internal drive control module 905 may further have other functions, and examples are not listed one by one herein. It should be noted that a person skilled in the art may set a function of the internal drive control module 905 based on a use requirement. This is not limited herein.

In an example, the internal drive control module 905 may be implemented by using one discrete device or a combination of a plurality of discrete devices, for example, may be a central processing unit (central processing unit, CPU), a digital signal processor, an application-specific integrated circuit, a field programmable gate array (field-programmable gate array, FPGA), or another programmable logic device. This is not limited herein.

The data storage module 906 is configured to store or read user data under control of the internal drive control module 905. In an example, the data storage module 906 may be a drive medium.

Figure 10A:
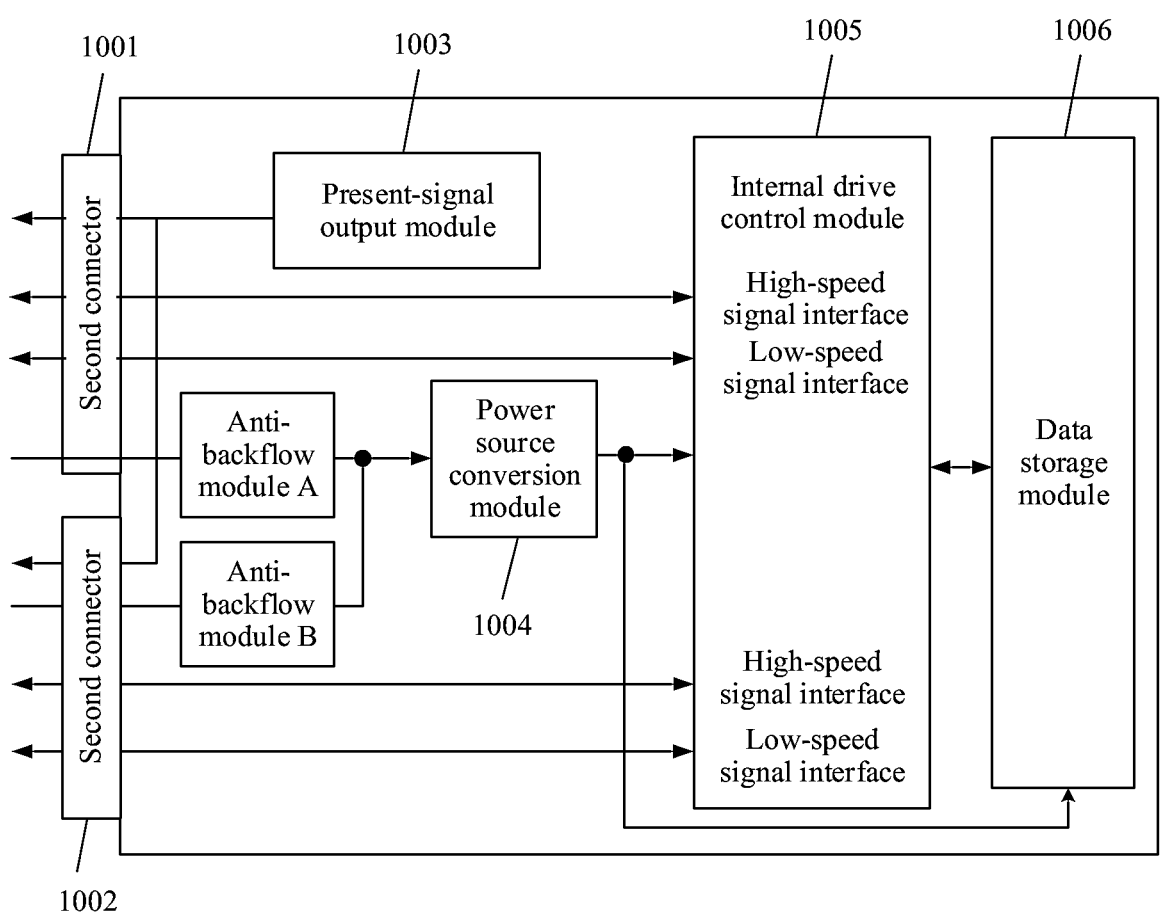
FIG. 10A is a schematic diagram of a general drive according to an embodiment of this disclosure.
Figure 10B:
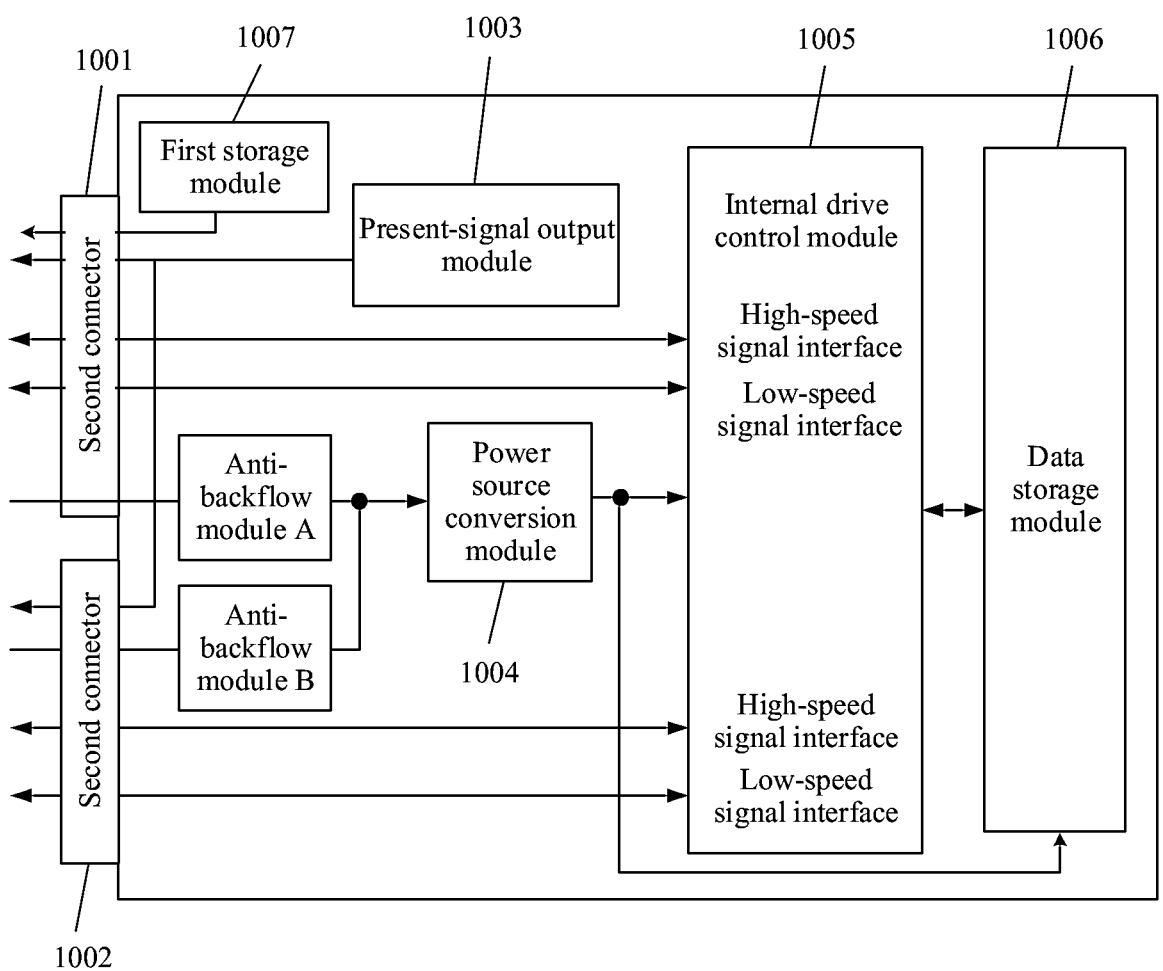
FIG. 10B is another schematic diagram of a general drive according to an embodiment of this disclosure.
Figure 10C:
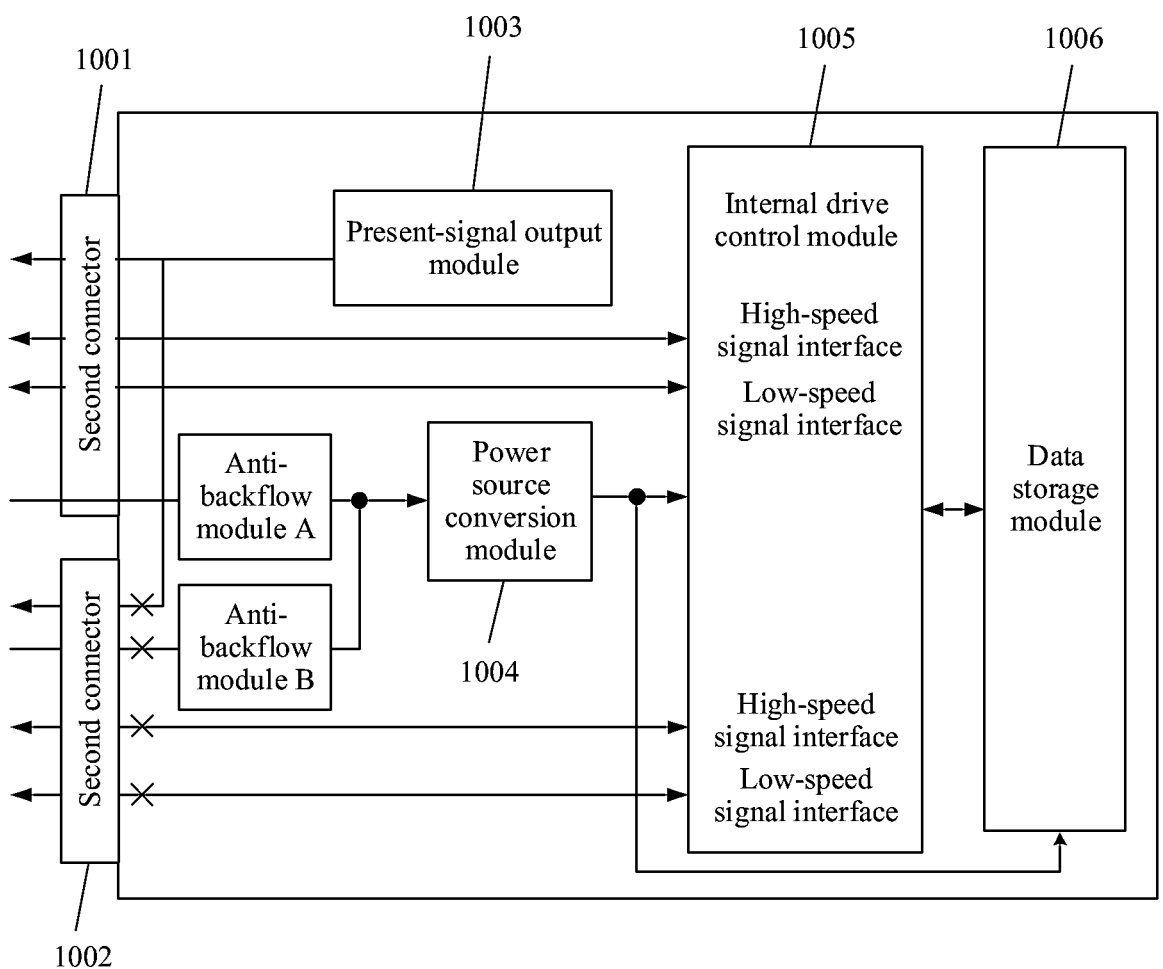
FIG. 10C is a schematic diagram in which a general drive controls a second connector 1002 to be in a communication stopped state according to an embodiment of this disclosure.

The Third Drive/General Drive:

Referring to FIG. 10A, the drive 303 includes two second connectors (which are a second connector 1001 and a second connector 1002), a present-signal output module 1003, an anti-backflow module A, an anti-backflow module B, a power source conversion module 1004, an internal drive control module 1005, and a data storage module 1006. In an example, referring to FIG. 10B, the drive 303 may further include a first storage module 1007.

The second connector 1001, the second connector 1002, the present-signal output module 1003, the power source conversion module 1004, the data storage module 1006, and the first storage module 1007 are respectively the same as the second connector 901, the second connector 902, the present-signal output module 903, the power source conversion module 904, the data storage module 906, and the first storage module 907 in FIG. 9A, and details are not described herein.

The following describes the internal drive control module 1005.

The internal drive control module 1005 is further configured to adjust a working mode of the drive in addition to the functions of the internal drive control module 905. The general drive has two working modes: a working mode of a distributed drive and a working mode of a centralized drive. The following describes a manner in which the internal drive control module 1005 adjusts the working mode of the general drive.

First Adjustment Manner:

If the general drive is in the working mode of the centralized drive, when the internal drive control module 1005 receives an instruction that is sent by the drive 303 to instruct the drive 303 to switch to the working mode of the distributed drive, the internal drive control module 1005 may control one access port of the second connector 1001 and the second connector 1002 to be in a communication stopped state. To be specific, the internal drive control module 1005 logically disables a function of the access port, and the internal drive control module 1005 does not receive or process any signal entered through the access port, and does not output any signal through the access port. The instruction may be sent by the control device 301 in band by using a high-speed signal, or may be indicated by the control device 301 by controlling a high or low level of a control signal cable used to transmit a signal of the control unit 30112 shown in FIG. 4. This is not limited herein.

In FIG. 10 C, for example, the second connector 1002 is controlled to be in a communication stopped state. The communication stopped state may be understood as follows: the drive cannot communicate, by using the connector in the communication stopped state, with the control device 301 connected to the connector. Therefore, a working mode of the drive is switched from the working mode of the centralized drive to the working mode of the distributed drive.

Figure 10D:
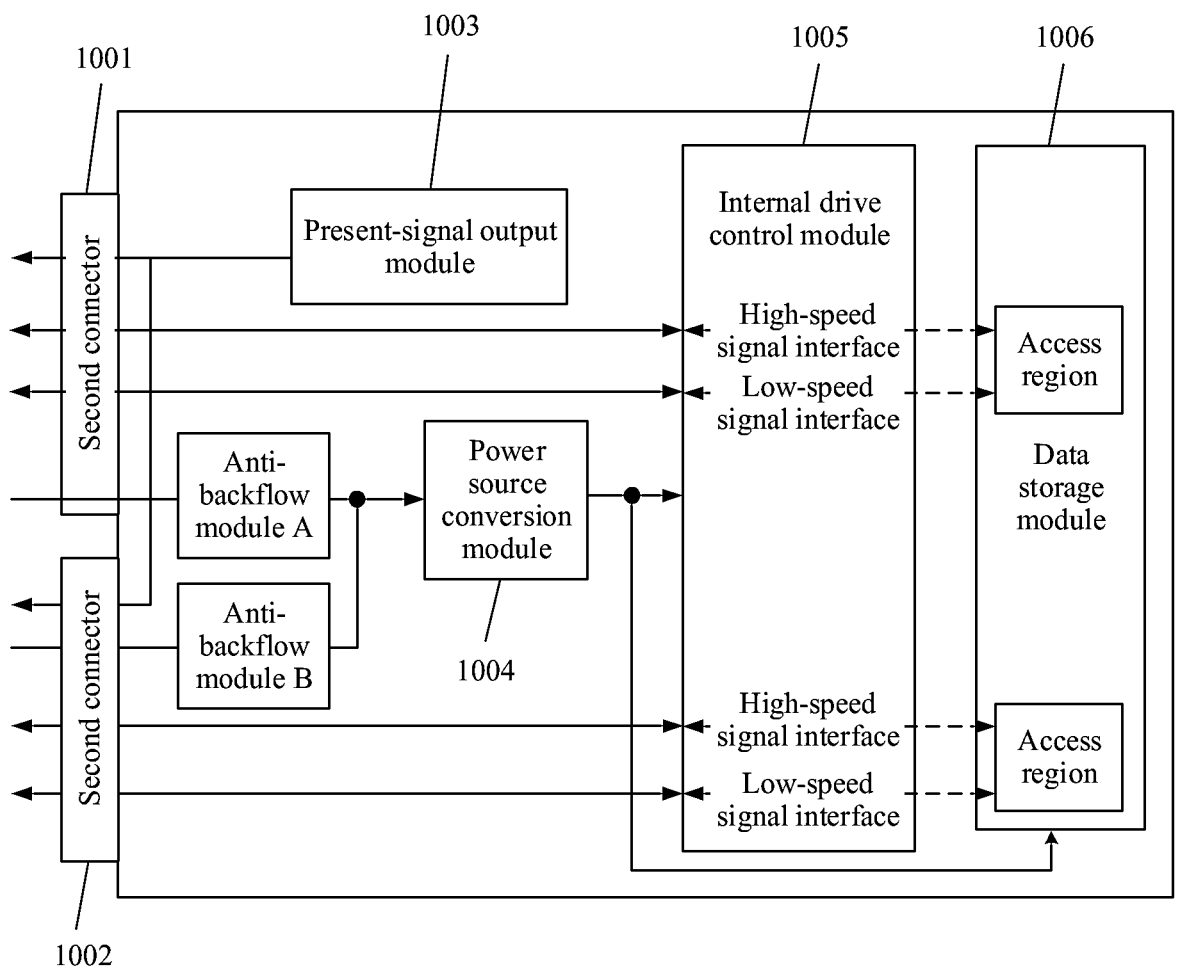
FIG. 10D is a schematic diagram in which a general drive divides a data storage module 1006 into two independent access regions according to an embodiment of this disclosure.

Second Adjustment Manner:

If the general drive is in the working mode of the centralized drive, when the internal drive control module 1005 receives an instruction that is sent by the drive 303 to instruct the drive 303 to switch to the working mode of the distributed drive, the internal drive control module 1005 may divide the data storage module 1006 in the drive 303 into two independent access areas, as shown in FIG. 10D. For example, the data storage module 1006 is drive media, and the data storage module 1006 includes 12 drive media in total, which are respectively marked as a drive medium 0 to a drive medium 11. The internal drive control module 1005 may group the drive medium 0 to the drive medium 5 into an independent access region, where the access region can be accessed only by using the second connector 1001, and group the drive medium 6 to the drive medium 11 into another independent access region, where the access region can be accessed only by using the second connector 1002, to switch the working mode of the drive from the working mode of the centralized drive to the working mode of the distributed drive.

Third Adjustment Manner:

If the general drive is in the working mode of the centralized drive, when the internal drive control module 1005 receives an instruction that is sent by the drive 303 to instruct the drive 303 to switch to the working mode of the distributed drive, the internal drive control module 1005 may recover a communication function of an access port in a communication stopped state. To be specific, the internal drive control module 1005 logically enables a function of the access port, and the internal drive control module 1005 receives or processes any signal entered through the access port, and outputs a signal through the access port. The instruction may be sent by the control device 301 in band by using a high-speed signal, or may be indicated by the control device 301 by controlling a high or low level of a control signal cable used to transmit a signal of the control unit 30112 shown in FIG. 4. This is not limited herein. Therefore, the working mode of the drive is switched from the working mode of the distributed drive to the working mode of the centralized drive.

Fourth Adjustment Manner:

If the general drive is in the working mode of the distributed drive, when the internal drive control module 1005 receives an instruction that is sent by the drive 303 to instruct the drive 303 to switch to the working mode of the centralized drive, the internal drive control module 1005 may cancel setting of dividing the data storage module 1006 into two independent access regions, so that the drive 303 includes only one independent access region, and the two control devices 301 connected to the second connector 1001 and the second connector 1002 can access any drive medium of the data storage module 1006. Therefore, the working mode of the drive is switched from the working mode of the distributed drive to the working mode of the centralized drive.

In this embodiment of this disclosure, a type of each drive 303 is determined according to related information such as a model, a capacity, and a manufacturer of the drive 303. A specific determining method is described above, and details are not described herein again.

In this way, the control device 301 is connected to different types of drives 303, to separately constitute a storage system in the distributed storage architecture and a storage system in the centralized storage architecture.

It should be noted that the second connector may be fixedly connected to the drive 303, or may be detachably connected to the drive 303. This is not limited herein.

When the control device 301 is connected to the distributed drive, the storage system in the distributed storage architecture may be formed. In an example, a structural diagram of the storage system in the distributed storage architecture may be the same as a structure of the storage system shown in FIG. 3D and FIG. 4. When the drives 303 connected to the first connectors 302 in FIG. 3D and FIG. 4 are distributed drives, the storage system in the distributed storage architecture is formed.

Figure 11:
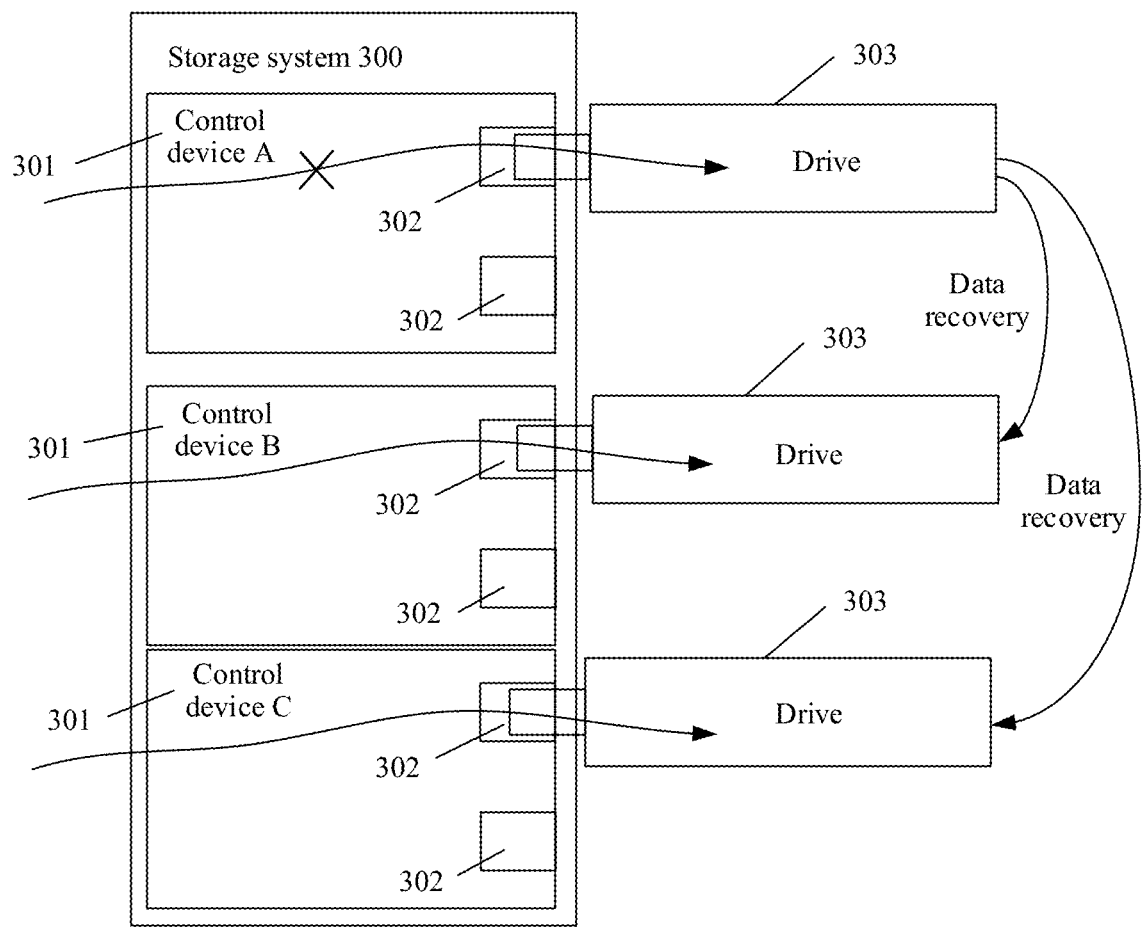
FIG. 11 is a schematic diagram in which a control device A in a distributed storage architecture is faulty according to an embodiment of this disclosure.

In the storage system in the distributed storage architecture shown in FIG. 3D, a control device A, a control device B, and a control device C are distributed access nodes independent of each other, and each control device independently accesses a drive connected to the control device. When one of the control devices is faulty, another node in the storage system takes over a service corresponding to the faulty control device, and data in a drive connected to the faulty control device may be restored by the another node based on data in another drive. As shown in FIG. 11, if the control device A is faulty, the control device B or the control device C may take over a service of the control device A, and data in a drive connected to the control device A may be restored, through restoring data in a drive connected to the control device B and restoring data in a drive connected to control device C, to the drive connected to the control device B and the drive connected to the control device C.

Figure 12A:
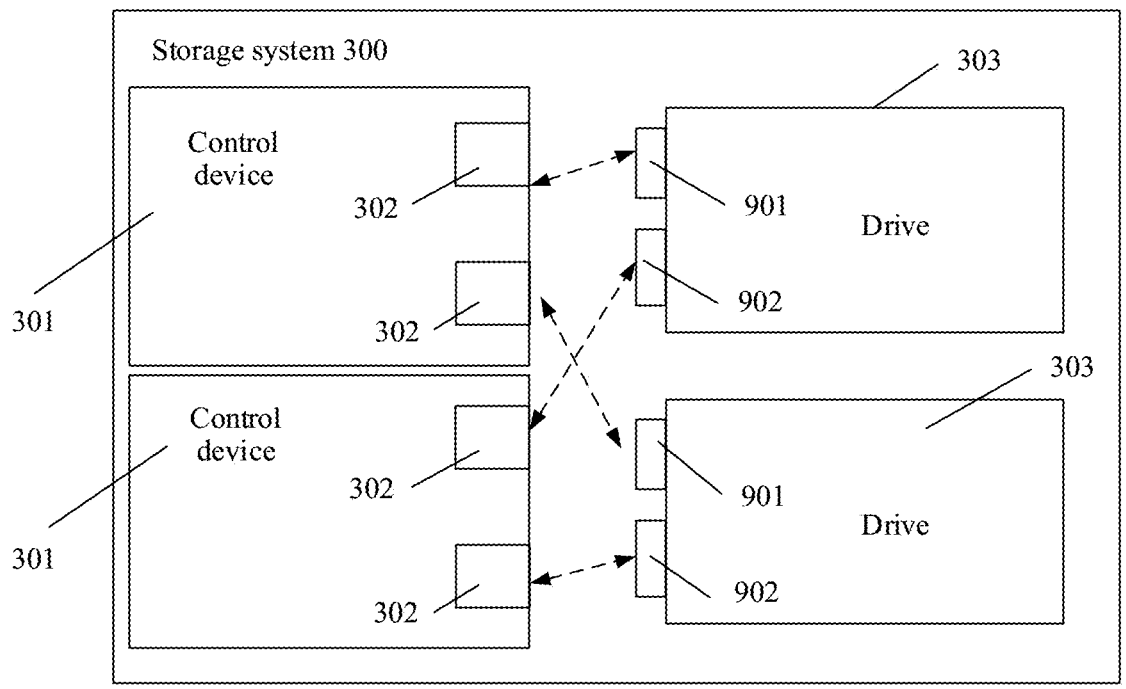
FIG. 12A is a schematic diagram of a storage system in a centralized storage architecture according to an embodiment of this disclosure.
Figure 12B:
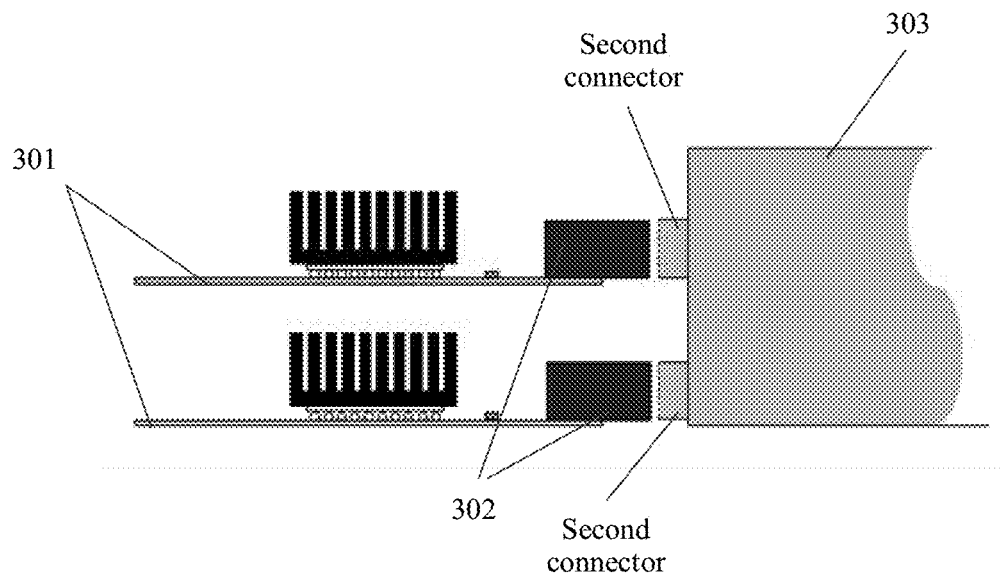
FIG. 12B is a side view of a storage system in a centralized storage architecture according to an embodiment of this disclosure.

When the control device 301 is connected to the centralized drive, the storage system in the centralized storage architecture may be formed. FIG. 12A and FIG. 12B are an example of the storage system in the centralized storage architecture. A storage system 300 includes two control devices 301 and two centralized drives 303, and each control device 301 includes two first connectors 302. Two first connectors 302 in the first control device 301 are respectively connected to second connectors 901 in the two centralized drives, and the two first connectors 302 in the second control device 301 are respectively connected to second connectors 902 in the two centralized drives. For ease of description, in FIG. 12A, dashed lines with arrows are used to indicate connection statuses between the first connectors 302 and the second connectors 901 and connection statuses between the first connectors 302 and the second connectors 902. FIG. 12B is a side view of the storage system 300.

In the storage system in the centralized storage architecture shown in FIG. 12B, because a drive may separately communicate with two control devices, when one of the control devices is faulty or removed, the other control device may take over a service of the faulty control device.

The control device 301 is detachably connected to a distributed drive or a centralized drive, so that different storage architectures can be formed based on use requirements. For example, when the distributed storage architecture needs to be formed, the control device 301 is enabled to be in a distributed working mode, and a distributed drive is inserted into the first connector 302. When it is required to switch to the centralized storage architecture, the control device 301 is enabled to be in a centralized working mode, the distributed drive is removed, and then a centralized drive is inserted.

To simplify a storage architecture switching process, the control device 301 may be directly connected to the general drive. When the storage system 300 needs to switch from the centralized storage architecture to the distributed storage architecture, the control device 301 runs a system code corresponding to the distributed storage architecture, and sends, to the drive 303, an instruction used to instruct the drive 303 to switch to the distributed drive. After receiving the instruction, the drive 303 may adjust the drive 303 to a distributed drive in the first adjustment manner or the second adjustment manner described above, to switch a storage architecture of the storage system 300 from the centralized storage architecture to the distributed storage architecture.

When the storage system 300 needs to switch from the distributed storage architecture to the centralized storage architecture, the control device 301 runs a system code corresponding to the centralized storage architecture, and sends, to the drive 303, an instruction used to instruct the drive 303 to switch to the centralized drive. After receiving the instruction, the drive 303 may adjust the drive 303 to a centralized drive in the third adjustment manner or the fourth adjustment manner described above, to switch the storage architecture of the storage system 300 from the distributed storage architecture to the centralized storage architecture. In this case, a connection relationship between the control device 301 and the drive 303 is the same as a connection relationship between the control device 301 and the drive 303 in the centralized storage architecture. For details, refer to FIG. 12A and FIG. 12B. Details are not described herein again.

It should be noted that the second connector may be directly connected to the first connector 302. For example, the second connector is inserted into the first connector, or the second connector may be connected to the first connector 302 in another manner. For example, the second connector may be connected to the first connector 302 by using a communications bus, and the communications bus may be a PCIE bus, an $I^2C$ bus, or the like. This is not limited herein.

The following describes the first connector 302 and the second connector.

In this embodiment of this disclosure, the first connector 302 and the second connector are perpendicular and orthogonal connectors that are reciprocal, or the first connector 301 and the second connector are connectors that are reciprocal and that have a preset rotation angle.

For example, the control device 301 includes one first connector 302, the drive 303 includes one second connector, the first connector 301 is a socket having a jack, and the second connector is a plug having a pin.

Figure 13A:
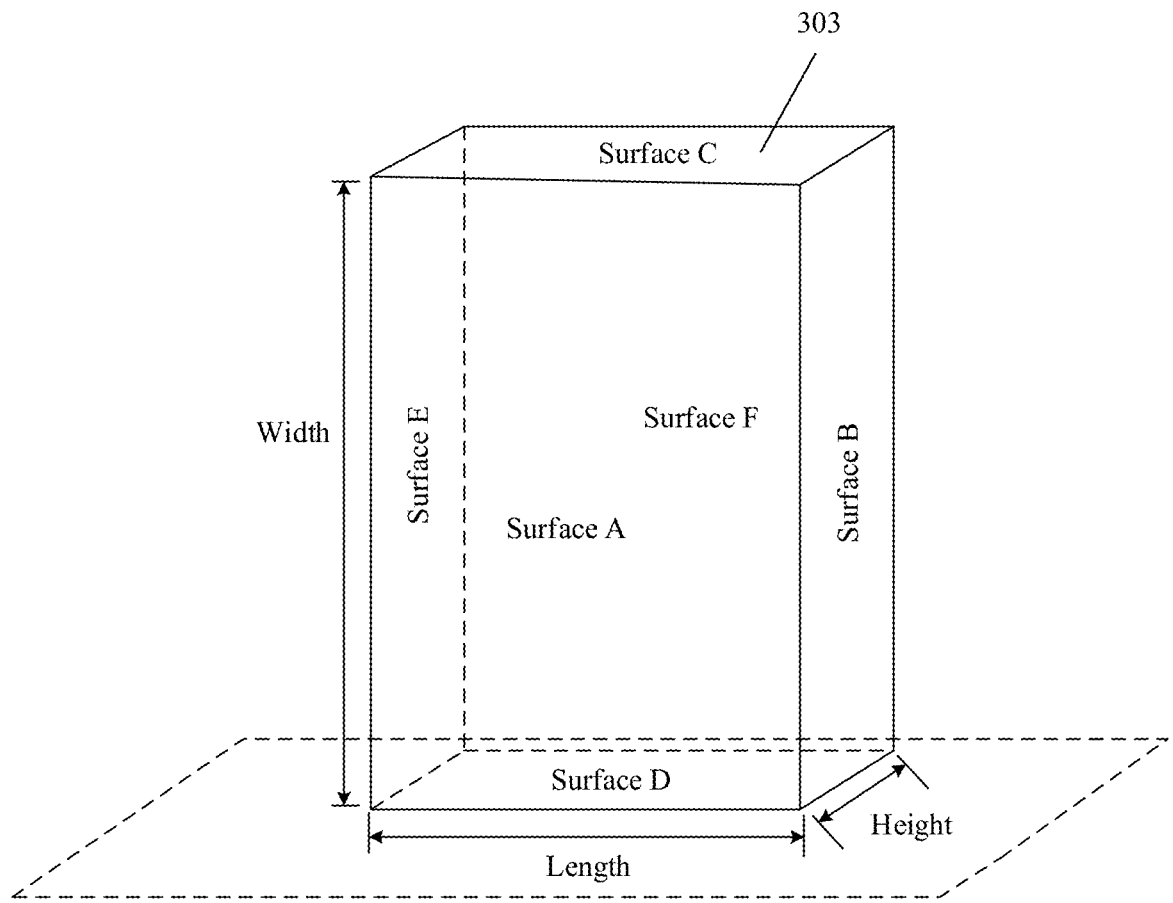
FIG. 13A is a schematic diagram of a drive 303 according to an embodiment of this disclosure.

In this embodiment of this disclosure, for example, the control device 301 may be a circuit board, and a shape of the drive 303 may be a cuboid. Referring to FIG. 13A, the drive 303 includes six surfaces that are respectively a surface A to a surface F. As shown in FIG. 13A, both the surface C and the surface D of the drive are parallel to a horizontal plane, and projections of the surface C and the surface D on the horizontal plane are a rectangle. Lengths of two long sides of the rectangle are the same as a length of the cuboid corresponding to the drive 303, and lengths of two short sides of the rectangle are the same as a height of the cuboid corresponding to the drive 303. The surface A, the surface F, the surface B, and the surface E of the drive are vertical to the horizontal plane. Projections of the surface A and the surface F on the horizontal plane are line segments, and lengths of the line segments are the same as the length of the cuboid corresponding to the drive 303. Projections of the surface B and the surface E on the horizontal plane are also line segments, and lengths of the line segments are the same as the height of the cuboid corresponding to the drive 303. The second connector is set on the surface E of the drive 303.

Figure 13B:
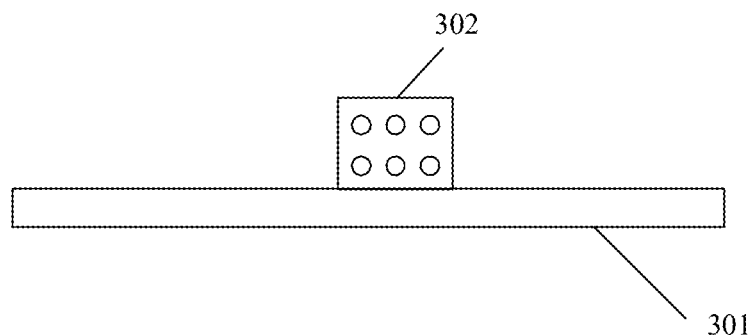
FIG. 13B is a side view of a control device 301 including one first connector 302 according to an embodiment of this disclosure.
Figure 13C:
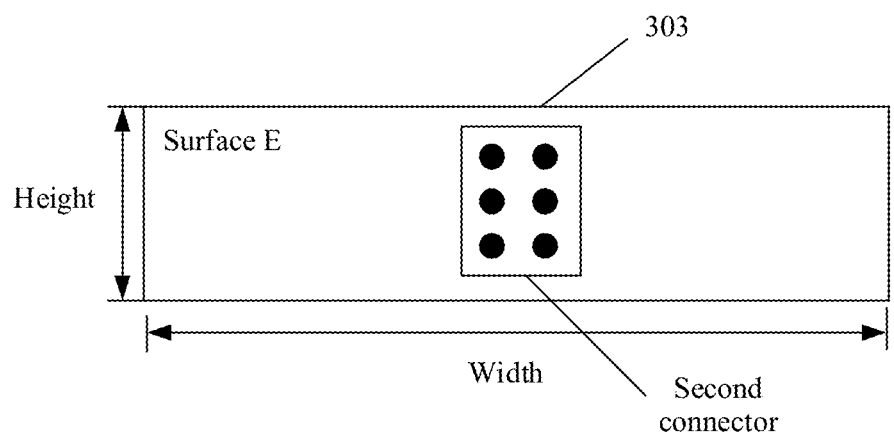
FIG. 13C is a side view of a drive 303 including one second connector according to an embodiment of this disclosure.
Figure 13D:
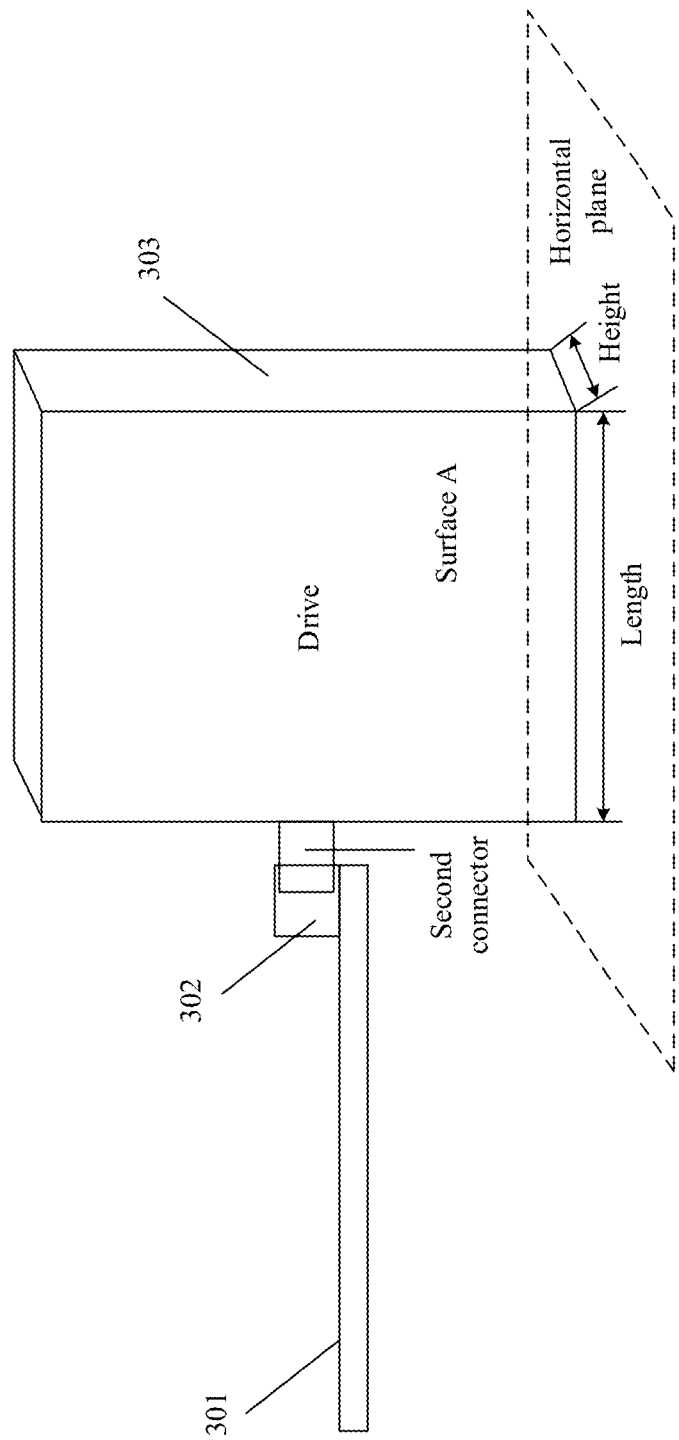
FIG. 13D is a schematic diagram of a connection relationship between a control device 301 and a drive 303 according to an embodiment of this disclosure.

FIG. 13B is a side view of a control device 301 including one first connector 302. In FIG. 13B, jacks in the first connector 301 are arranged in 2 rows×3 columns, two adjacent jacks in each row are spaced at a same spacing, and three jacks in the first row are aligned with three jacks in the second row. FIG. 13C is a side view of a drive 303 including one second connector. In FIG. 13C, pins in the second connector are arranged in 3 rows×2 columns, two adjacent pins in each row are spaced at a same spacing, and in addition, two pins of every two rows are aligned with each other. When the second connector is inserted into the first connector 302, the control device 301 and the drive 303 are in a location relationship shown in FIG. 13D. FIG. 13D is a side view of the control device 301 and the drive 303. In FIG. 13D, the control device 301 is set horizontally, a surface C of the drive 303 is parallel to the horizontal plane, and a surface A of the drive 303 is perpendicular to the horizontal plane.

A height of a cuboid is usually less than a length or a width of the cuboid, so that one control device 301 may communicate with more drives 303, and a capacity expansion requirement of the storage system is met.

Figure 14A:
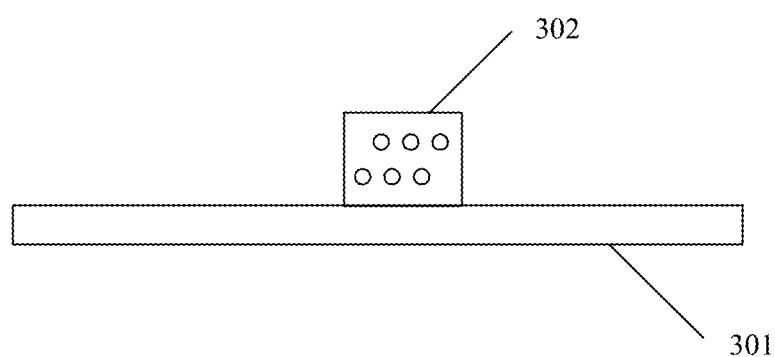
FIG. 14A is a side view of another control device 301 including one first connector 302 according to an embodiment of this disclosure.
Figure 14B:
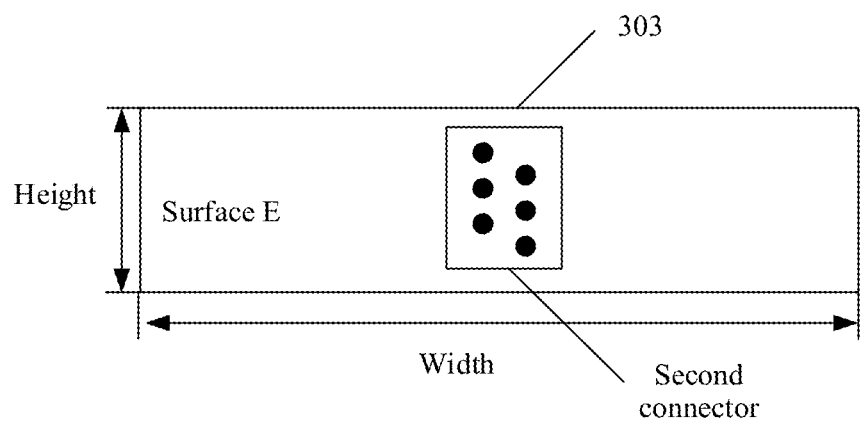
FIG. 14B is a side view of another drive 303 including one second connector according to an embodiment of this disclosure.
Figure 14C:
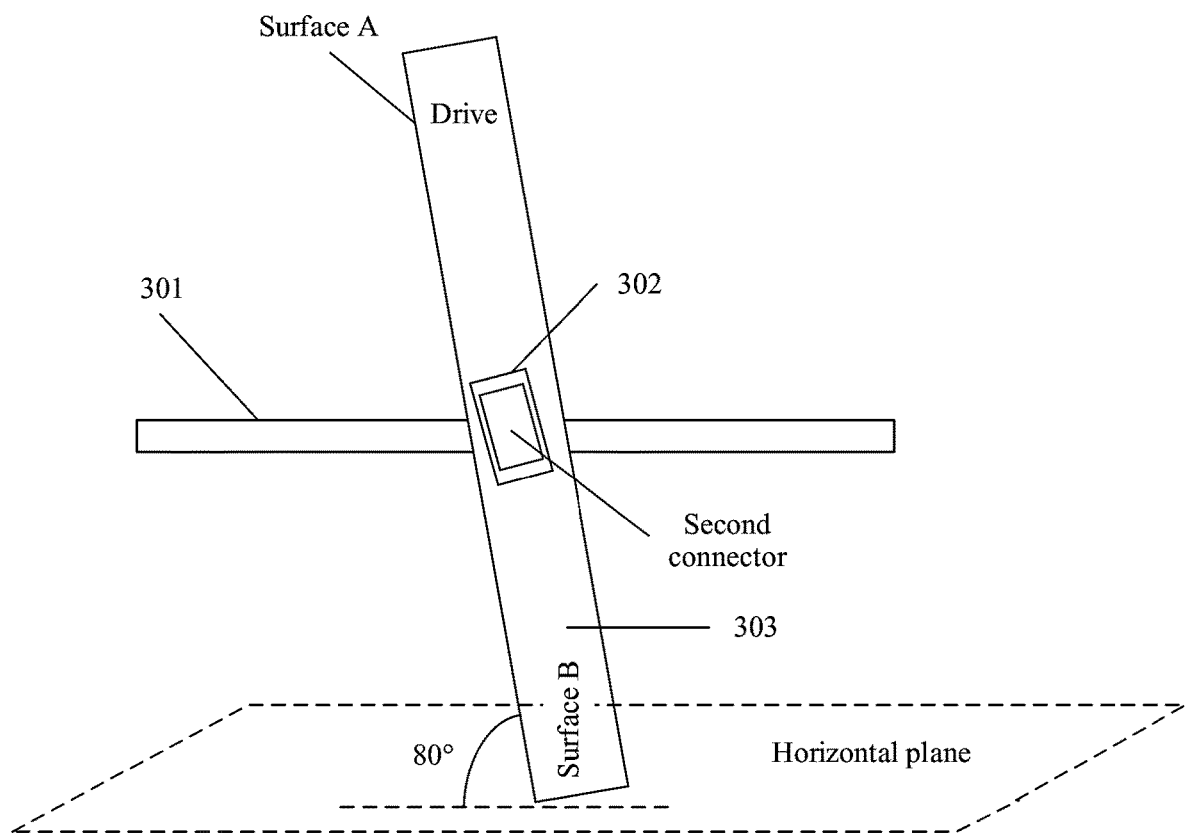
FIG. 14C is a schematic diagram of another connection relationship between a control device 301 and a drive 303 according to an embodiment of this disclosure.

FIG. 14A is a side view of a control device 301 including one first connector 302. In FIG. 14A, jacks in the first connector 301 are arranged in two rows, two adjacent jacks in each row are spaced at a same spacing, and there is a specific distance between the first jack in the first row and the first jack in the second row. FIG. 14B is a side view of a drive 303 including one second connector. In FIG. 14B, pins in the second connector are arranged in two rows, two adjacent jacks in each row are spaced at a same spacing, and there is a specific distance between the first jack in the first row and the first jack in the second row. When the second connector is inserted into the first connector 302, the control device 301 and the drive 303 are in a location relationship shown in FIG. 14C. FIG. 14C is a side view of the control device 301 and the drive 303. In FIG. 14C, the control device 301 is set horizontally, and there is a preset included angle between a surface A of the drive 303 and the horizontal plane. In FIG. 14 C, for example, an included angle between the surface A of the drive 303 and the horizontal plane is 80 degrees. Certainly, the surface A of the drive 303 and the horizontal plane may alternatively be arranged at another angle, and the angle between the surface A of the drive 303 and the horizontal plane is related to arrangement positions of the pins in the drive 303, and is not limited herein.

In the foregoing technical solution, the first connector 302 and the second connector are connectors that are perpendicular and orthogonal or connectors that have a preset rotation angle, so that the first connector 302 and the second connector can overcome relative shifts between the control device 301 and the drive 303 in directions of an X axis, a Y axis, and a Z axis in a space coordinate system. Therefore, a plurality of control devices 301 can be reliably connected to a plurality of drives 303. A backplane in the prior art can be removed, to reduce a design complexity of the storage system and reduce a probability that the entire storage system cannot be used due to a fault of the backplane, thereby improving reliability of the storage system.

Further, the backplane in the prior art is removed, so that impedance mismatch points between the control device 301 and the drive 303 in a communication process can be reduced. To be specific, impedance mismatch between the control device 301 and the backplane and impedance mismatch between the backplane and the drive are reduced. This can improve a signal transmission rate.

Further, the backplane in the prior art is removed, so that air flow obstacle points in the storage system are reduced, and heat dissipation performance of the storage system can be improved. Therefore, in specific space of the storage system and with specific heat dissipation performance of the storage system, more drives can be allowed in the storage system, and density in the storage system can be improved.

A person skilled in the art may select different first connectors 302 and second connectors based on actual use requirements to set relative positions of the control device 301 and the drive 303.

In addition, it should be noted that, when the control device 301 includes a plurality of first connectors 302, a specific interval needs to be set between the plurality of first connectors 302. For example, when the control device 301 and the drive 303 are connected in the second connection manner shown in FIG. 14C, an interval between every two first connectors 302 in the control device 301 is greater than or equal to the height of the drive 303. For a definition of the height of the drive 303, refer to FIG. 13A. Details are not described herein.

In the foregoing technical solution, based on use requirements, the storage system in the centralized storage architecture or the storage system of the distributed storage architecture may be flexibly constructed by connecting the control device 301 to drives 303 with different configurations. In addition, when the storage architecture needs to be switched, only working modes of the control device 301 and the drive 303 need to be switched or the drive 303 is replaced, and the control device 301 and the drive 303 do not need to be purchased again. This improves flexibility of the storage system and reduces switching costs of the storage architecture.

Based on a same inventive concept, an embodiment of this disclosure provides a storage system running method. The method is applied to the storage system shown in FIG. 3D, FIG. 4, or FIG. 12A.

Figure 15A:
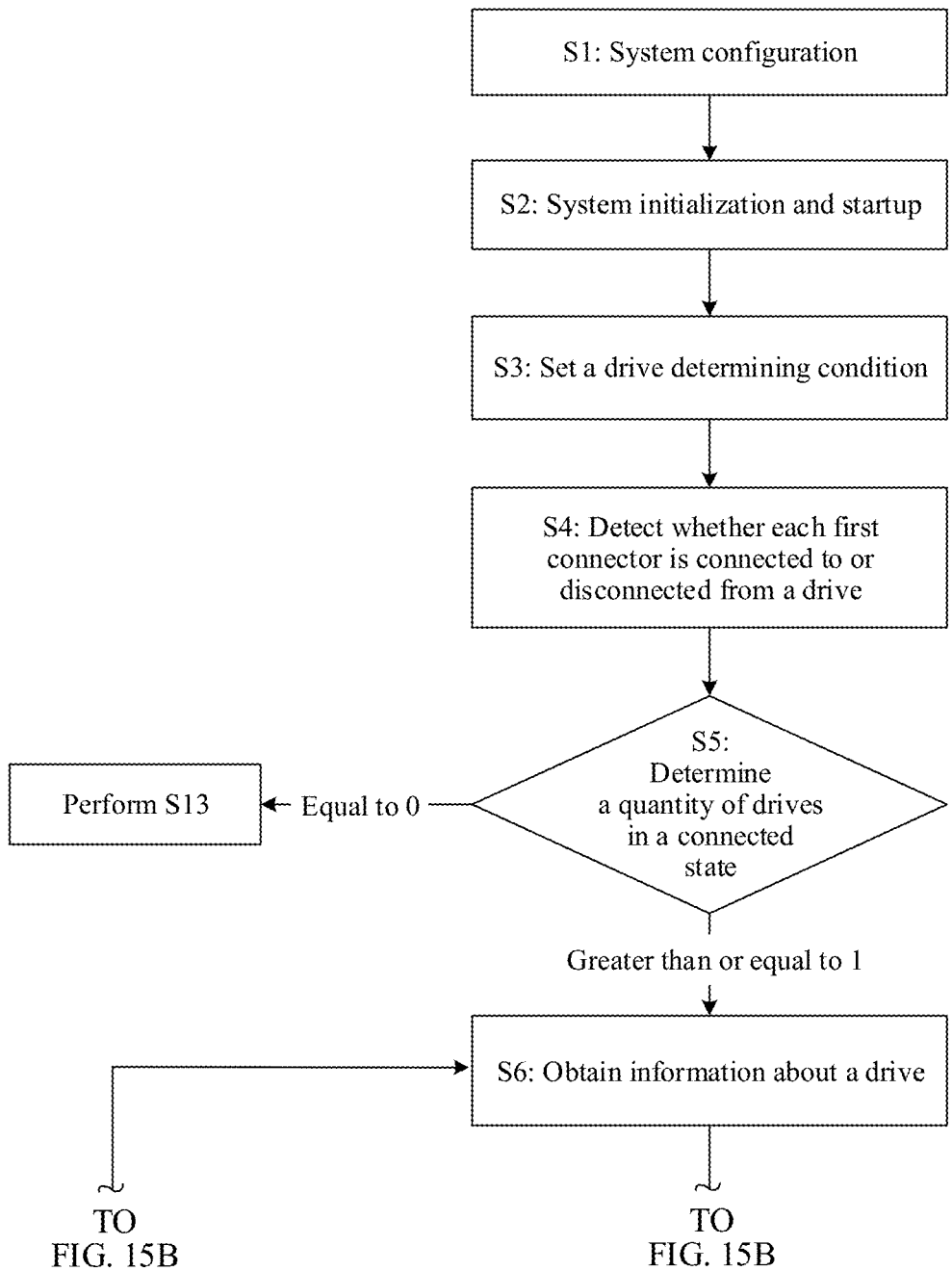
Figure 15C:
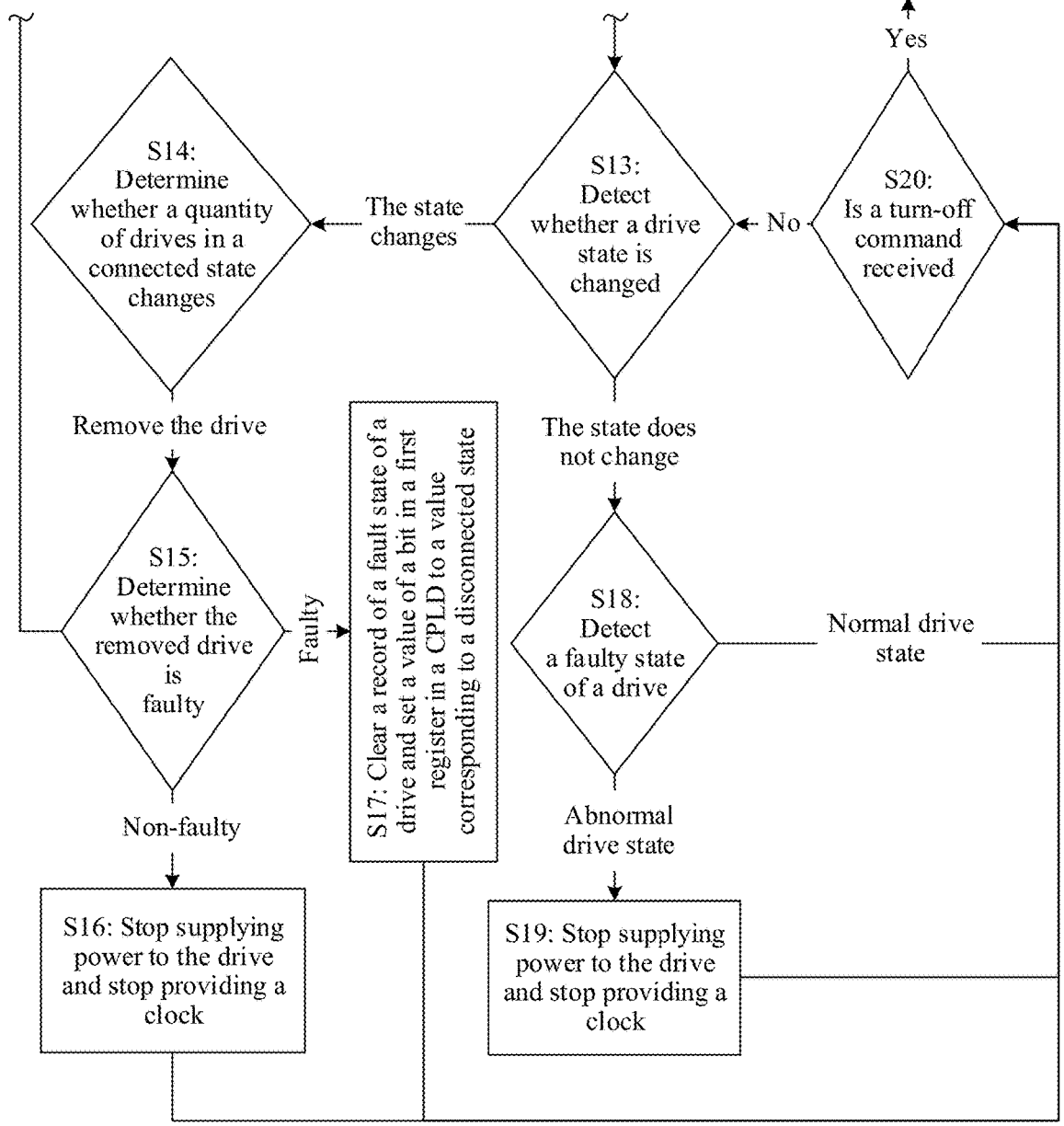

FIG. 15A to FIG. 15C are a flowchart of a storage system running method according to an embodiment of this disclosure. The flowchart is described as follows:

S1: A control device performs system configuration.

In an example, the control device may be connected to a client. In the client, a user may set a type of a storage system based on a use requirement. For example, the user may set the storage system to a centralized storage architecture or a distributed storage architecture. After receiving an instruction from the client, the control device may perform the system configuration according to the instruction. The system configuration includes system code configuration of the control device. For example, a memory in the control device stores a system code corresponding to the centralized storage architecture and a system code corresponding to the distributed storage architecture, and a corresponding system code is configured for the storage system according to the instruction of the client.

The system configuration may further include drive configuration. When a drive connected to the control device is the general drive shown in FIG. 10A, the control device may send an instruction to the drive, to set the drive to a distributed drive or a centralized drive. For example, when the instruction from the client instructs to set the storage system to the centralized storage architecture, an instruction may be sent to the drive, to set a quantity of access ports of the drive to 2. When the instruction from the client instructs to set the storage system to the distributed storage architecture, an instruction may be sent to the drive, to set the quantity of access ports of the drive to 1. Certainly, a quantity of access regions in the drive may alternatively be set, and details are not described herein.

It should be noted that step S1 is an optional step, in other words, step S1 does not need to be performed. For example, the user may directly select, based on a use requirement, a control device and a drive that correspond to a to-be-used storage architecture. For example, if the user needs to use the centralized storage architecture, the user may directly connect a control device that can implement the centralized storage architecture to the centralized drive. In this case, step S1 does not need to be performed.

S2: The control device is started and initialized.

S3: The control device sets a drive determining condition based on a type of the system configuration.

In this embodiment of this disclosure, the drive determining condition is used to determine whether the drive connected to the control device matches the control device. For example, when being in a centralized storage architecture, the control device determines, based on the drive determining condition, whether the drive connected to the control device is the centralized drive. In an example, if the control device determines that the system code configured for the storage system is the system code corresponding to the centralized storage architecture, the control device configures a drive determining condition as a centralized drive determining condition. The centralized drive determining condition may include information such as a manufacturer and a model of the centralized drive. For example, the centralized determining condition may be a manufacturer A or a model A. If the control device determines that the system code configured for the storage system is the system code corresponding to the distributed storage architecture, the control device configures the drive determining condition as a distributed drive determining condition. Correspondingly, the distributed drive determining condition may include information such as a manufacturer and a model of the distributed drive. For example, the distributed determining condition may be a manufacturer B or a model B. Certainly, the centralized drive determining condition and the distributed drive determining condition may alternatively be other parameters, and this is not limited herein.

S4: The control device detects whether each first connector is connected to or disconnected from a drive.

In an example, a CPU in the control device may detect a present signal of the drive by using a CPLD, determine whether each first connector is connected to or disconnected from the drive, and store a determining result in a corresponding register in the CPLD. The CPU reads values of bits stored in the register, to determine whether each first connector is connected to or disconnected from the drive. When a first connector is disconnected from a drive, the control device may output an alarm by using a display of the client. For example, the control device outputs prompt information to the client, and the prompt information carries an index number of the first connector. Certainly, another alarm mode may alternatively be used, and is not limited herein.

S5: The control device determines a quantity of drives in a connected state.

The control device detects whether each first connector is connected to or disconnected from the drive, to determine the quantity of drives in the connected state. If the quantity of drives in the connected state is equal to 0, S13 is to be performed. If the quantity of drives in the connected state is greater than or equal to 1, S6 is to be performed.

S6: The control device obtains information about a drive in the connected state.

In an example, the CPU in the control device may obtain information about each drive in the connected state by using a PCIE switch, or may send an instruction to the drive in the connected state by using a PCIE bus, to obtain the information about each drive in the connected state. The information includes related information such as a model, a capacity, and a manufacturer of the drive.

S7: The control device determines a quantity of matching drives.

Specifically, after obtaining the information about the drive in the connected state, the CPU in the control device determines a type of each drive in the connected state based on the determining condition set in S3. For example, if the determining condition set in S3 is the centralized drive determining condition, and the centralized drive determining condition is the manufacturer A, the CPU determines whether a manufacturer of the drive in the connected state is the manufacturer A. If the manufacturer of the drive in the connected state is the manufacturer A, the CPU determines that the drive is a matching drive; if the manufacturer of the drive in the connected state is not the manufacturer A, the CPU determines that the drive is a non-matching drive. The CPU may store a determining result of the drive in the connected state in a corresponding register in the CPLD, for example, a second register. When determining that a drive is a matching drive, the CPU sets, to 1, a value of a bit in the second register corresponding to the drive in the CPLD; when determining that a drive is a non-matching drive, the CPU sets the value to 0. In addition, after determining that a drive is a non-matching drive, the CPU may further output alarm information to the client.

Then, the CPU in the control device may calculate a quantity of matching drives by using a value of a bit in the second register, corresponding to each drive in the connected state, in the CPLD. If the quantity of matching drives is equal to 0, S13 is to be performed; if the quantity of matching drives is equal to 1, S8 is to be performed; if the quantity of matching drives is greater than 1, S10 is to be performed.

It should be noted that, in this embodiment of this disclosure, a performing sequence between steps S4 and S5 and steps S6 and S7 is not limited. To be specific, the control device may first perform steps S4 and S5 and then perform steps S6 and S7, or may first perform steps S6 and S7 and then perform steps S4 and S5, or may synchronously perform steps S4 and S5 and steps S6 and S7. A person skilled in the art may set the sequence based on usage.

S8: The control device performs a power-on startup process of a single drive.

It should be noted that when performing step S6, the CPU in the control device may obtain the information by using the PCIE switch in step S6, or may obtain the information by using the PCIE bus in step S6, and therefore, a performing sequence of step S8 is described for the two different implementations.

If the information is obtained by using the PCIE switch in step S6, step S8 is performed after step S6. If the information is obtained by using the PCIE bus in step S6, the control device needs to first perform step S8 to power on the drive and then perform step S6.

S9: The control device controls a corresponding matching drive to be in a working state.

Specifically, the CPU in the control device controls a clock signal generator to provide the matching drive with a working clock and/or a clock used for transmitting a high-speed signal, so that the matching drive is in a working state.

S10: The control device performs a process of in-batch power-on.

Specifically, when determining that the quantity of matching drives is greater than 1, the CPU in the control device may first power on one or some of a plurality of matching drives based on a preset reliability policy or a fault tolerance policy, and then power on remaining drives. Specific policy content is not limited herein.

S11: The control device controls corresponding matching drives to be in a working state in batches.

Step S11 is the same as step S9, and details are not described again.

S12: Start a storage system in a corresponding architecture.

S13: The control device detects whether a connected state or a disconnected state between a drive and a first connector changes.

Specifically, the PCIE switch in the control device monitors, by using an interrupt signal of the CPLD, whether the connected state or the disconnected state of the drive and the first connector changes. If the PCIE switch obtains the interrupt signal of the CPLD through detection, the PCIE switch determines that the change occurs, and the S14 is to be performed. If the PCIE switch does not obtain the interrupt signal of the CPLD through detection, the PCIE switch determines that no change occurs, and the S18 is to be performed.

S14: The control device determines whether the quantity of drives in the connected state changes.

Specifically, the CPU in the control device determines, based on the value of the bit in the first register in the CPLD, whether the quantity of drives in the connected state changes. If the CPU determines, based on the value of the bit in the first register, that the quantity of drives in the connected state increases, the CPU determines that a drive is inserted, and step S5 is to be performed. If the CPU determines, based on the value in the first register, that the quantity of drives in the connected state decreases, the CPU determines that a drive is removed, and step S15 is to be performed.

S15: The control device determines whether the removed drive is a faulty drive.

Specifically, the CPLD in the control device monitors a working state of each drive in the connected state in real time, and stores a monitoring result in a register configured to store a faulty state of a drive in the CPLD. When determining that a drive is removed, the CPU reads a value of a bit in the register that is configured to store a faulty state of the drive and that is corresponding to the drive in the CPLD, to determine whether the drive is a faulty drive. If the drive is a faulty drive, step S17 is to be performed. If the drive is not a faulty drive, step S16 is to be performed.

S16: The control device controls the drive to be in a power-off state, stops providing a clock signal for the drive, and sets the value of the bit in the first register in the CPLD to a value corresponding to the disconnected state.

S17: The control device clears a record of the faulty state of the drive, and sets the value of the bit in the first register in the CPLD to a value corresponding to the disconnected state.

Because the drive has already been removed, the control device needs to clear the record of the faulty state of the drive. In other words, the value of the bit, used to indicate whether the drive is in the faulty state, in the register configured to store the faulty state of the drive in the CPLD is set to an initial value. In an example, the initial value of the bit in the register configured to store the faulty state of the drive in the CPLD is 0, so that the value of the bit is set to 0.

S18: The control device detects a faulty state of the drive.

The CPU reads the value of the bit in the register that is configured to store the faulty state of the drive in the CPLD and that is corresponding to the drive, to determine whether the drive is a faulty drive. If the drive is a faulty drive, step S19 is to be performed. If the drive is not a faulty drive, step S20 is to be performed.

S19: The control device controls the drive to be in a power-off state, stops providing a clock signal for the drive, and sets the value of the bit in the first register in the CPLD to a value corresponding to the disconnected state.

S20: The control device detects whether a turn-off command is received.

The CPU in the control device monitors whether the turn-off command from the client is received. If the turn-off command is received, step S21 is to be performed; if no turn-off instruction is received, step S13 is to be performed.

S21: Stop.

In the storage system running method shown in FIG. 15A to FIG. 15C, before startup, the control device in the storage system has determined a working mode of the control device, to be specific, the mode running in the centralized storage architecture or the mode running in the distributed storage architecture, and then the storage system runs in the working mode.

Figure 16:
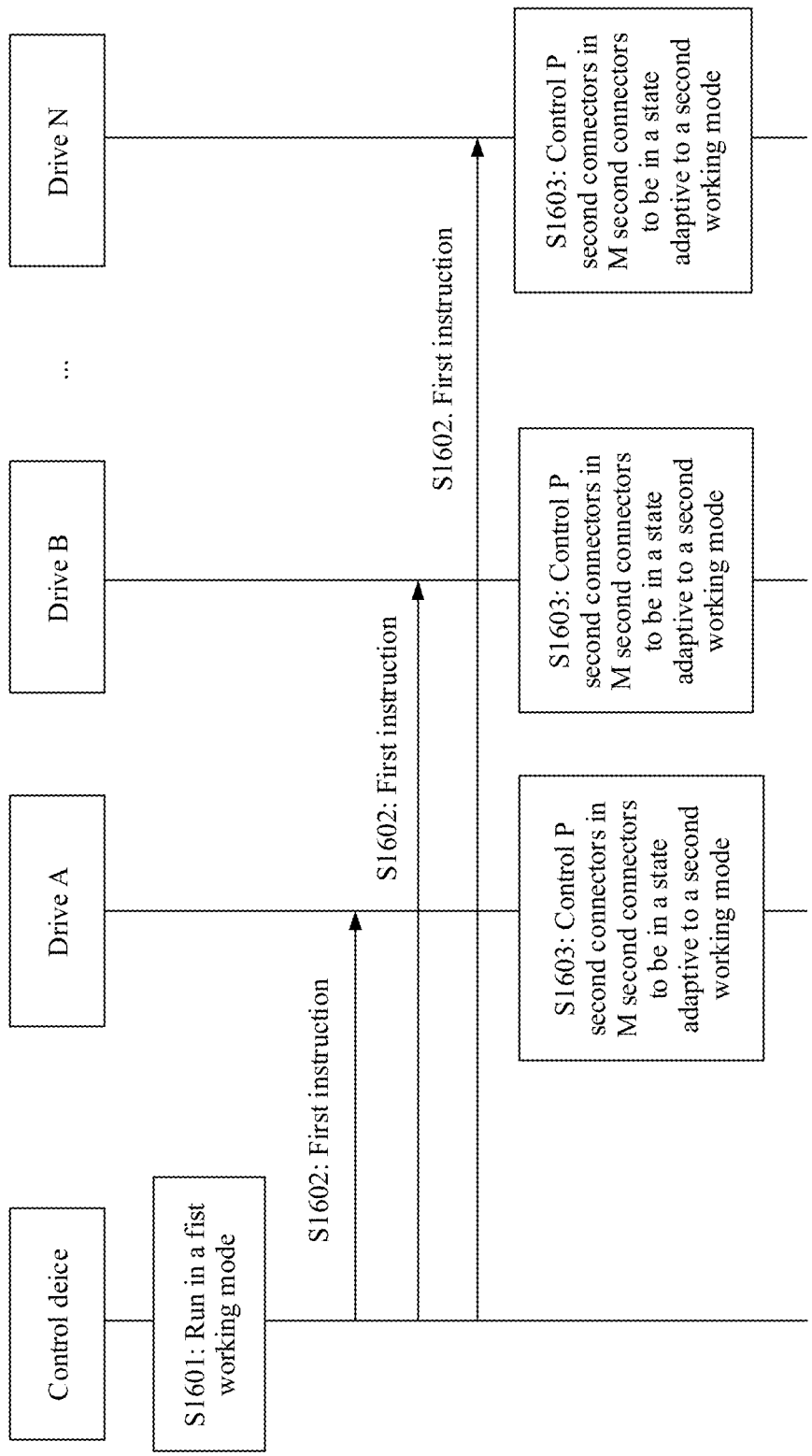
FIG. 16 is a flowchart of a method for switching a working mode of a storage system according to an embodiment of this disclosure.

In a storage system in an embodiment of this disclosure, working mode switching may be further performed during running. FIG. 16 is a flowchart of a method for switching a working mode of the storage system according to an embodiment of this disclosure. The flowchart is described as follows:

Step S1601: M control devices in the storage system run in a first working mode.

In this embodiment of this disclosure, the M control devices support the first working mode and a second working mode, and the first working mode and the second working mode have the following two definitions:

First Definition:

When the first working mode is a mode running in a centralized storage architecture, the second working mode is a mode running in a distributed storage architecture.

Second Definition:

When the first working mode is a mode running in a distributed storage architecture, the second working mode is a mode running in a centralized storage architecture.

It should be noted that M is a positive integer. Specific content of the first working mode and the second working mode is already described above, and details are not described herein again.

Step S1602: The at least one control device in the M control devices sends a first instruction to each of K drives in the storage system, and each of the K drives receives the first instruction.

In this embodiment of this disclosure, the first instruction is used to instruct the drive that receives the first instruction to work in the second working mode.

In an example, the M control devices may be separately connected to a client, and the M control devices receive an instruction that is sent by the client to switch from the first working mode to the second working mode, to send the first instruction to the K drives. The M control devices may also run in the first working mode in a first time period and run in the second working mode in a second time period by using a pre-stored running policy, for example, a user setting, and the storage system sends the first instruction to the K drives when determining that a switching condition is met. Alternatively, a primary control device and a secondary control device may be set in the M control devices. The primary control device determines, from the client or by using the pre-stored running policy, that the drives need to be switched from the first working mode to the second working mode, and sends the first instruction to each of the K drives. Certainly, the M control devices may also be triggered in another manner to send the first instruction to each drive in the K drives, and this is not limited herein.

It should be noted that the first instruction may be sent by each of the M control devices, or may be sent by one or some of the M control devices. This is not limited herein.

In the storage system, each of the M control devices may communicate with the K drives by using all of N first connectors and all of N second connectors, or each of the M control devices may communicate with the K drives by using some of the N first connectors and some of the N second connectors. The N first connectors are configured to detachably connect to the M control devices, and the N second connectors are configured to detachably connect to the K drives. Each of the K drives is configured to store data, and N and K are positive integers.

It should be noted that, a structure of the first connector, a structure of the second connector, a manner of connecting the first connector to the control device, a manner of connecting the second connector to the drive, and structures and functions of the control device and the drive are already described above, and are not described herein again.

In addition, it should be noted that a performing sequence of step S1601 and step S1602 is not limited in this embodiment of this disclosure. To be specific, step S1601 may be first performed, and then step S1602 is performed; or step S1602 is first performed, and then step S1601 is performed; or step S1601 and step 1602 are performed simultaneously.

Step S1603: Each of the K drives controls, according to the first instruction, P second connectors in X second connectors in each drive to be in a state adaptive to the second working mode.

In this embodiment of this disclosure, the second working mode may be the mode running in the distributed storage architecture, or may be the mode running in the centralized storage architecture. Therefore, a definition of controlling the P second connectors in the X second connectors in each drive to be in the state adaptive to the second working mode is also different, and is specifically as follows:

When the second working mode is the mode running in the distributed storage architecture, the controlling one of the P second connectors to be in the state adaptive to the second working mode includes:

controlling a drive to stop communicating, by using the second connector, with a control device corresponding to a first connector connected to the second connector, where X and P are positive integers, and a difference between X and P is 1.

When the second working mode is the mode running in the centralized storage architecture, the controlling the P second connectors to be in the state adaptive to the second working mode includes:

controlling the drive to resume communicating, by using L second connectors in the P second connectors, with control devices corresponding to L first connectors connected to the L second connectors, where L is a positive integer, and L is less than or equal to P.

It should be noted that, a manner of controlling the drive to stop communicating, by using the second connector, with the control device corresponding to the first connector connected to the second connector, and a manner of controlling the drive to resume communicating, by using the L second connectors, with the control devices corresponding to the L first connectors connected to the L second connectors have been described above, and details are not described herein again.

After the drive completes switching the working mode, the entire storage system is switched from the storage architecture corresponding to the first working mode to the storage architecture corresponding to the second working mode, to complete a storage architecture switching process.

In the foregoing technical solution, when the storage system needs to switch a working mode, the working mode of the control device is switched and the control device sends a working mode switching instruction to a drive, to switch the working mode of the storage system without changing a hardware structure and a connection relationship. The steps of switching the working mode of the storage system can be simplified.

With descriptions of the foregoing implementations, a person skilled in the art may clearly understand that the embodiments of this disclosure may be implemented by hardware, firmware or a combination thereof. When the embodiments of this disclosure are implemented by software, the foregoing functions may be stored in a computer readable medium or transmitted as one or more instructions or code in the computer readable medium. The computer-readable medium includes a computer storage medium and a communications medium. The communications medium includes any medium that facilitates transmission of a computer program from one place to another. The storage medium may be any usable medium accessible by a computer. This is used as an example but is not limited to: The computer-readable medium may include a RAM, a ROM, an electrically erasable programmable read-only memory (electrically erasable programmable read only memory, EEPROM), a read-only disc (compact disc read-Only memory, CD-ROM) or another optical disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (Digital Subscriber Line, DSL) or wireless technologies such as infrared ray, radio, and microwave, the coaxial cable, optical fiber/cable, twisted pair, DSL or wireless technologies such as infrared ray, radio, and microwave are included in fixation of a medium to which they belong. For example, a disk (disk) and disc (disc) used in the embodiments of the present disclosure includes a compact disc (compact disc, CD), a laser disc, an optical disc, a digital versatile disc (digital video disc, DVD), a floppy disk, and a Blu-ray disc. The disk generally copies data by a magnetic means, and the disc copies data optically by a laser means. The foregoing combination should also be included in the protection scope of the computer-readable medium.

What is claimed is:
1. A storage system comprising:
a storage drive comprising a physical connector A and a physical connector B, wherein the physical connector A and the physical connector B are two independent access ports;
a first control device connected to the storage drive through the physical connector A and configured to access the storage drive through the physical connector A; and a second control device connected to the storage drive through the physical connector B and configured to access the storage drive through the physical connector B;

wherein the storage drive is configured to:

provide in the storage drive a first storage space accessible to the first control device through the physical connector A; and provide in the storage drive a second storage space accessible to the second control device through the physical connector B, wherein the first storage space is different from the second storage space; or wherein the storage drive is configured to:

provide in the storage drive a third storage space accessible to the first control device through the physical connector A and accessible to the second control device through the physical connector B.

2. The storage system according to claim 1, wherein the first control device is configured to access a first storage space in the storage drive through the physical connector A; and the second control device is configured to access a second storage space in the storage drive through the physical connector B, wherein the first storage space is different from the second storage space.

3. The storage system according to claim 1, wherein the first control device is configured to access a third storage space in the storage drive through the physical connector A; and the second control device is configured to access the third storage space in the storage drive through the physical connector B.

4. The storage system according to claim 1, wherein the first control device is further configured to:

obtain a state of the storage drive; and stop supplying power to the physical connector A when the storage drive is in a disconnected state or a faulty state.

5. The storage system according to claim 1, wherein the storage drive further comprises:

a high-speed signal interface configured to transmit service data to the first control device and the second control device; and a low-speed signal interface configured to receive an instruction from the first control device or the second control device, wherein the instruction is for obtaining information regarding the storage drive.

6. The storage system according to claim 1, wherein physical connector A and physical connector B are PCIe connectors or NVMe connectors.

7. The storage system according to claim 1, wherein the storage drive is a solid state drive (SSD).

8. A storage drive comprising:

a physical connector A, a physical connector B, and a controller coupled to the physical connector A and the physical connector B and configured to control access to the storage drive through the physical connector A and the physical connector B separately, wherein the physical connector A and the physical connector B are two independent access ports;

wherein the controller is further configured to:

provide a first storage space in the storage drive for access by a first control device through the physical connector A; and provide a second storage space in the storage drive for access by a second control device through the physical connector B, wherein the first storage space is different from the second storage space; or wherein the controller is further configured to:

provide a third storage space in the storage drive for access by a first control device through the physical connector A and by a second control device through the physical connector B.

9. The storage drive according to claim 8, further comprising:

a high-speed signal interface, configured to transmit service data to the first control device and the second control device; and a low-speed signal interface, configured to receive an instruction from a first control device through the first physical connector or a second control device through the second physical connector, wherein the instruction is for obtaining information regarding the storage drive.

10. The storage drive according to claim 8, wherein the physical connector A and physical connector B are PCIe connectors or NVMe connectors.

11. The storage drive according to claim 8, wherein the storage drive is a solid state drive (SSD).

12. A method for accessing a storage drive in a storage system, comprising:

accessing, by a first control device of the storage system, the storage drive through a physical connector A of the storage drive; and accessing, by a second control device of the storage system, the storage drive through a physical connector B of the storage drive, wherein the physical connector A and the physical connector B are two independent access ports on the storage drive;

wherein the step of accessing by the first control device accesses a first storage space in the storage drive through the physical connector A, and the step of accessing by the second control device accesses a second storage space in the storage drive through the physical connector B, the first storage space being different from the second storage space; or wherein the step of accessing by the first control device accesses a third storage space in the storage drive through the physical connector A, and the step of accessing by the second control device accesses the third storage space in the storage drive through the physical connector B.

13. The method according to claim 12, further comprising:

obtaining, by the first control device, a state of the storage drive; and stop supplying, by the first control device, power to the physical connector A when the storage drive is in a disconnected state or a faulty state.

14. The method according to claim 12, wherein the storage drive is a solid state drive (SSD).

* * * * *